United States Patent
Potnis et al.

(10) Patent No.: US 11,262,585 B2
(45) Date of Patent: Mar. 1, 2022

(54) OPTICAL COMBINER LENS WITH SPACERS BETWEEN LENS AND LIGHTGUIDE

(71) Applicant: GOOGLE LLC, Mountain View, CA (US)

(72) Inventors: Shreyas Potnis, Kitchener (CA); Daniel Adema, Kitchener (CA); Timothy Paul Bodiya, Toronto (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/671,312

(22) Filed: Nov. 1, 2019

(65) Prior Publication Data

US 2020/0355922 A1 Nov. 12, 2020

Related U.S. Application Data

(60) Provisional application No. 62/845,956, filed on May 10, 2019, provisional application No. 62/789,908, filed on Jan. 8, 2019, provisional application No. 62/782,918, filed on Dec. 20, 2018, provisional application No. 62/754,339, filed on Nov. 1, 2018.

(51) Int. Cl.
| | |
|---|---|
| *G02B 27/01* | (2006.01) |
| *G02B 27/14* | (2006.01) |
| *F21V 8/00* | (2006.01) |
| *G02B 6/00* | (2006.01) |

(52) U.S. Cl.
CPC ......... *G02B 27/0172* (2013.01); *G02B 6/005* (2013.01); *G02B 27/14* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 5,905,545 | A * | 5/1999 | Poradish | H04N 9/3108 348/743 |
| 9,568,734 | B1 * | 2/2017 | Giri | G02B 27/0176 |
| 10,643,392 | B2 * | 5/2020 | Schowengerdt | G02B 6/34 |
| 2007/0070859 | A1 * | 3/2007 | Hirayama | G02B 27/0172 369/112.04 |
| 2012/0268720 | A1 * | 10/2012 | Wang | G02B 5/04 353/81 |
| 2013/0242392 | A1 * | 9/2013 | Amirparviz | G02B 5/3058 359/485.05 |
| 2013/0300635 | A1 * | 11/2013 | White | G02B 3/14 345/7 |
| 2017/0336636 | A1 * | 11/2017 | Amitai | G02B 6/34 |
| 2018/0341111 | A1 | 11/2018 | Karvonen et al. | |
| 2019/0094549 | A1 | 3/2019 | Nicholson et al. | |
| 2020/0200964 | A1 * | 6/2020 | Adema | G02B 6/0076 |
| 2020/0355923 | A1 * | 11/2020 | Potnis | G02B 27/0172 |
| 2020/0386994 | A1 | 12/2020 | Potnis et al. | |

OTHER PUBLICATIONS

Non-Final Office Action dated Sep. 7, 2021 for U.S. Appl. No. 16/671,373, 28 pages.

\* cited by examiner

*Primary Examiner* — Michelle R Connelly

(57) ABSTRACT

An optical combiner lens includes a lens and a lightguide with a gap defined between the lens and the lightguide. Spacers are disposed in the gap to maintain the gap at a set height. A method of making the optical combiner lens and a wearable heads-up display including the optical combiner lens are disclosed.

17 Claims, 24 Drawing Sheets

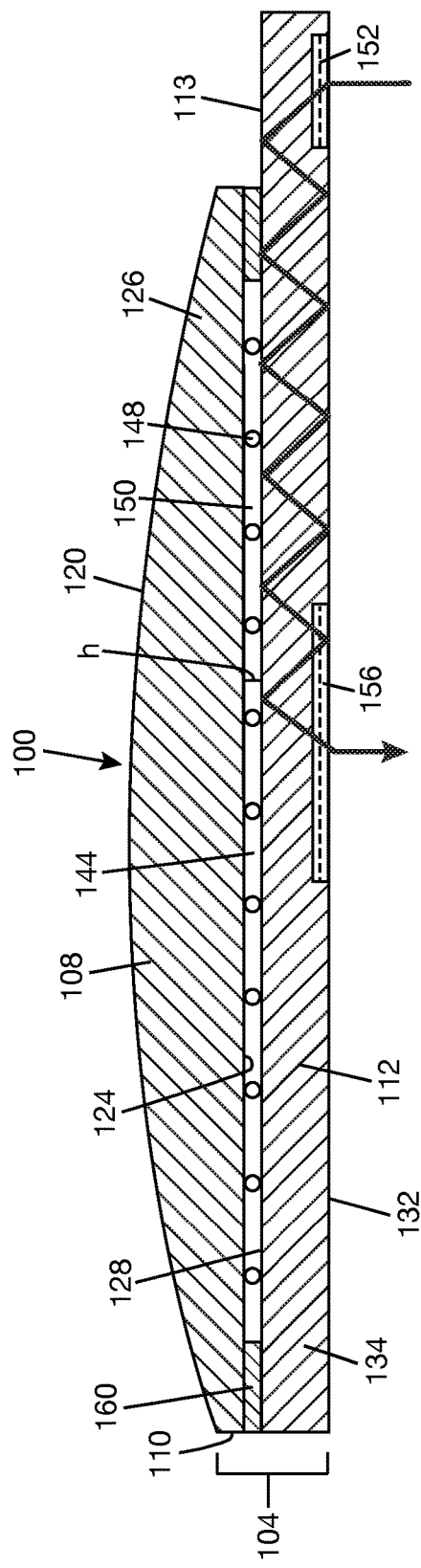
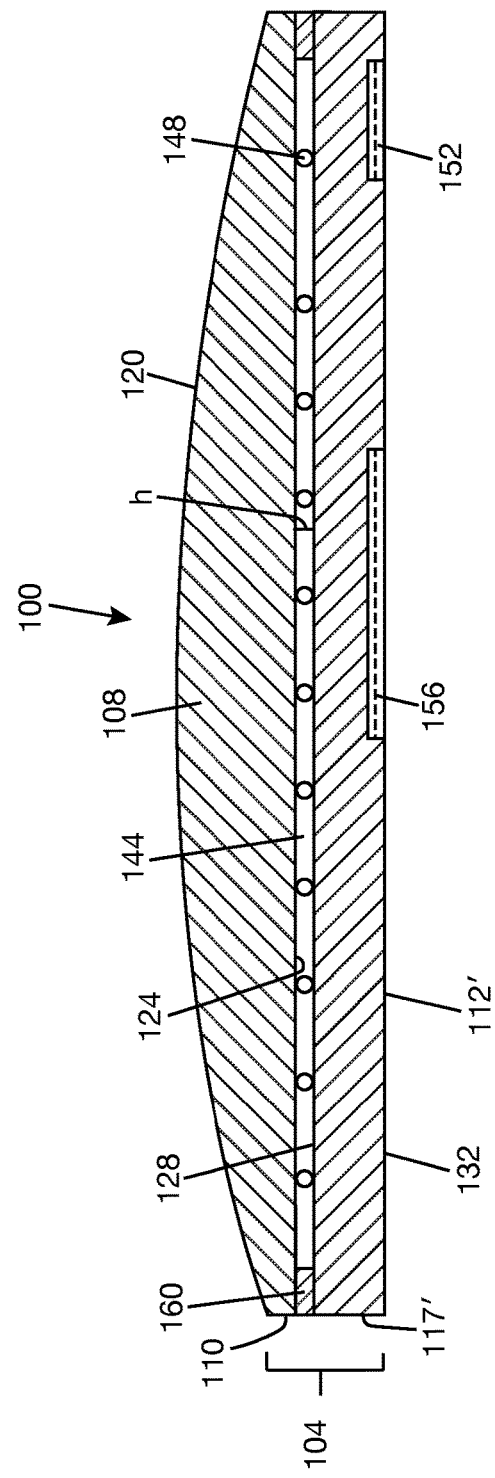

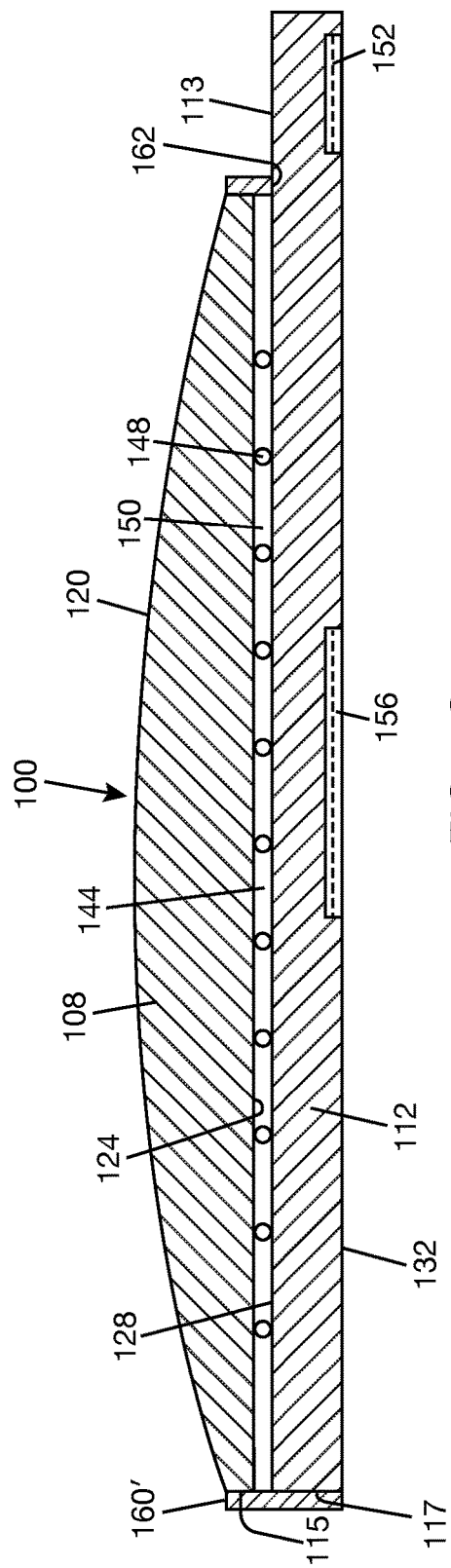
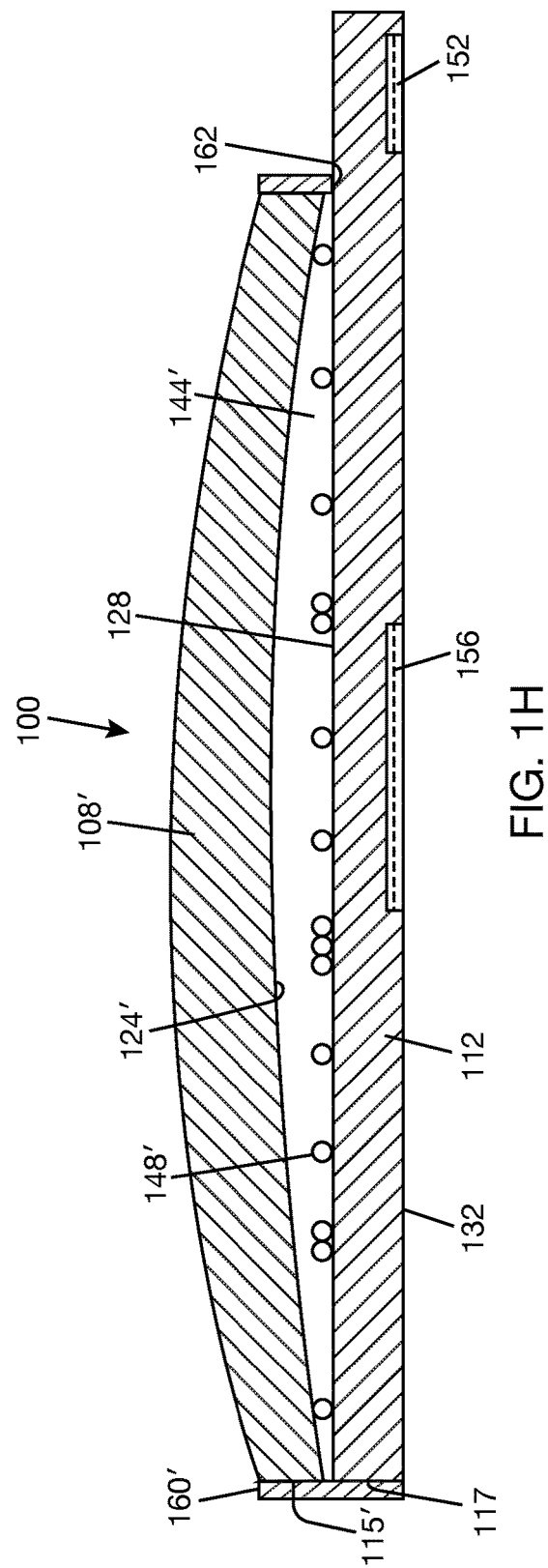
FIG. 1G
FIG. 1H

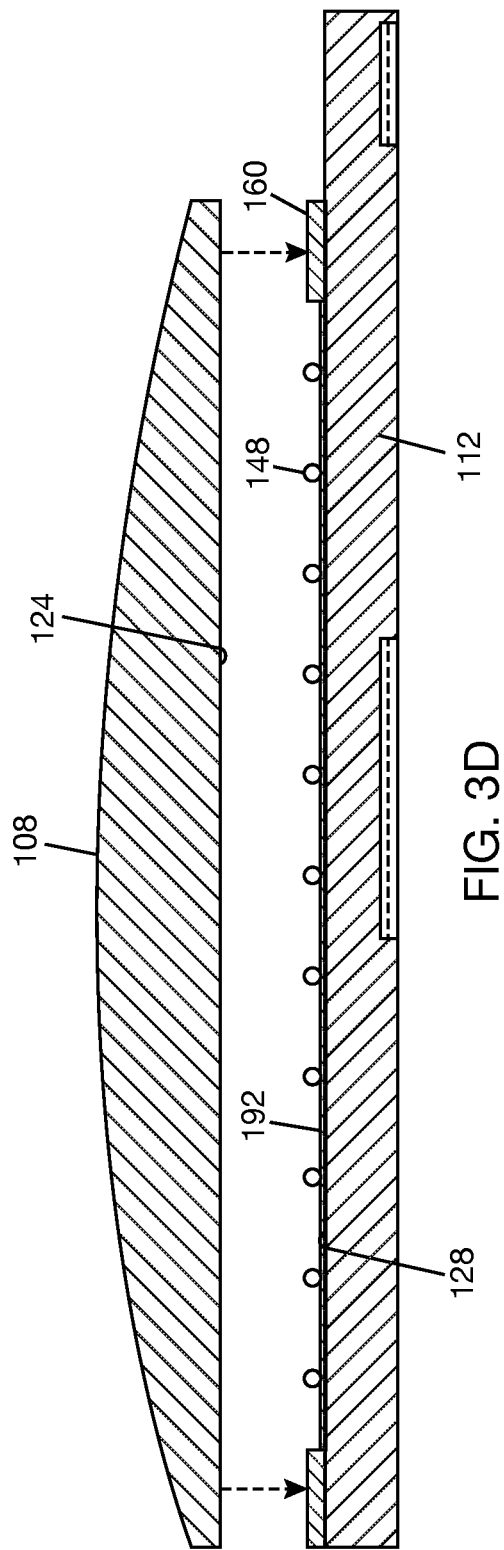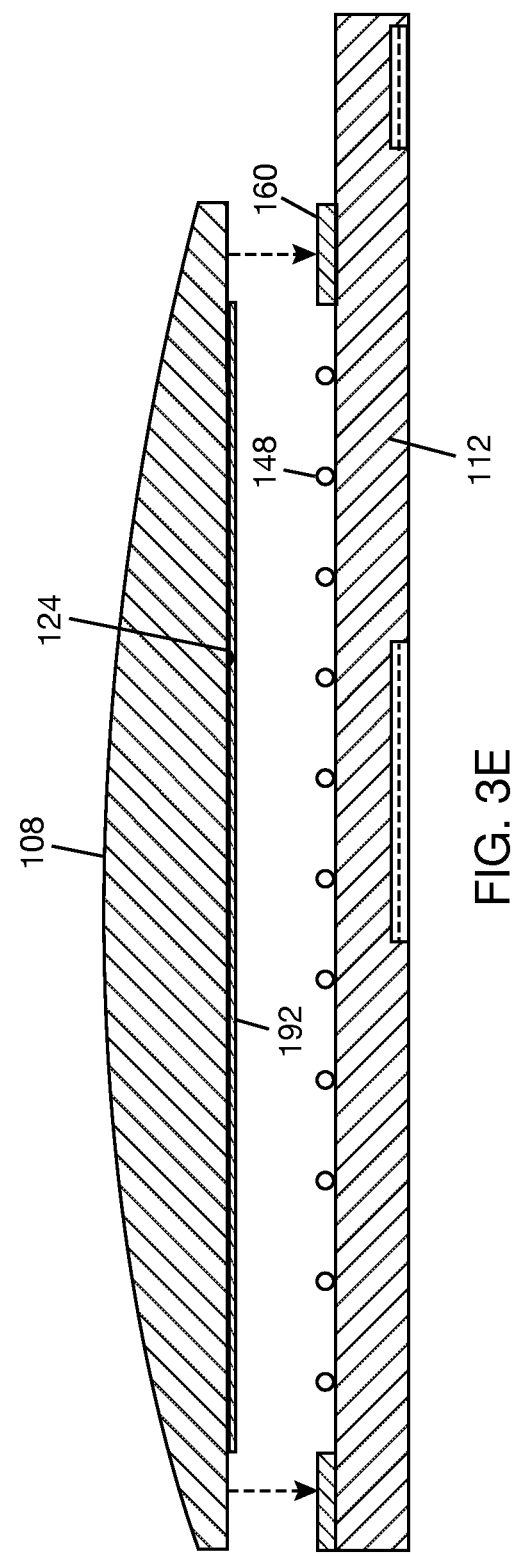

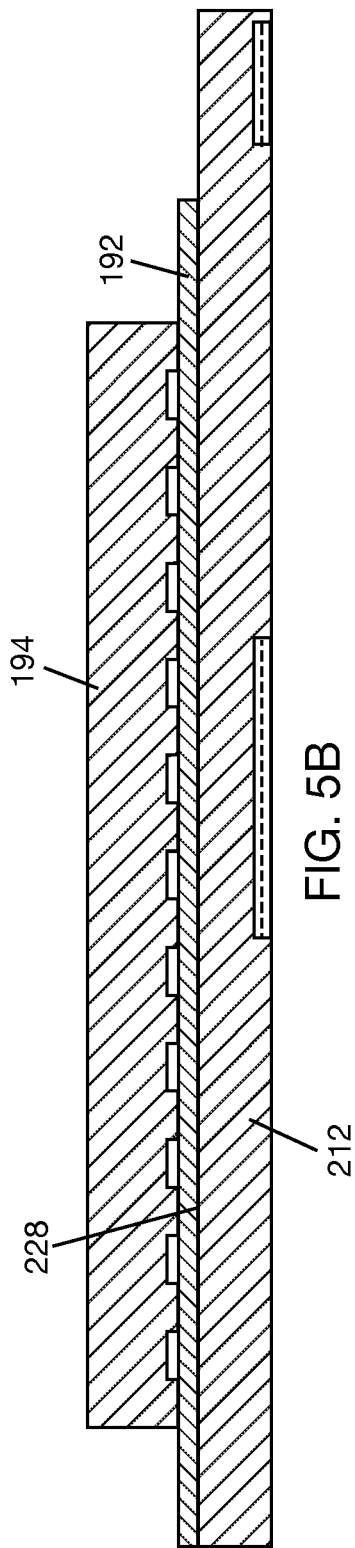
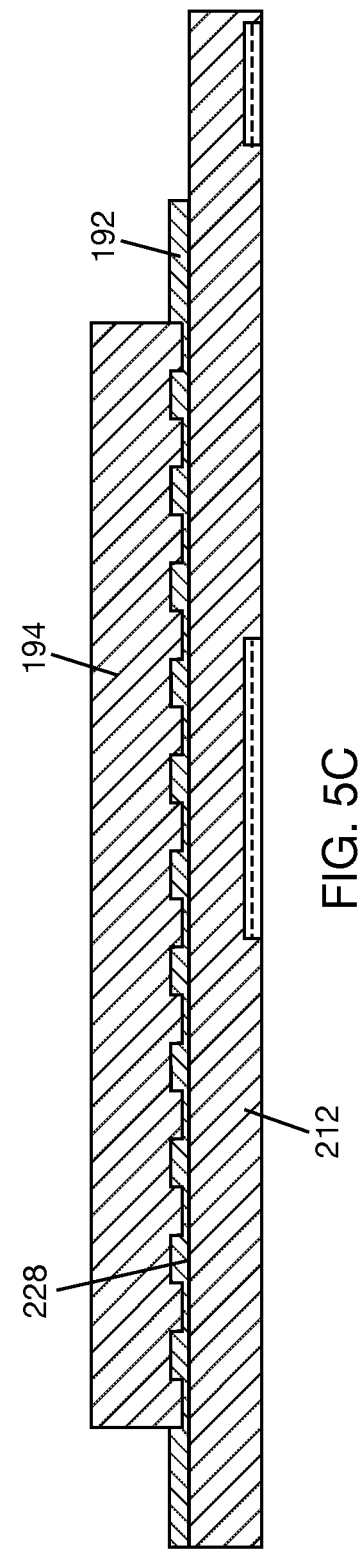

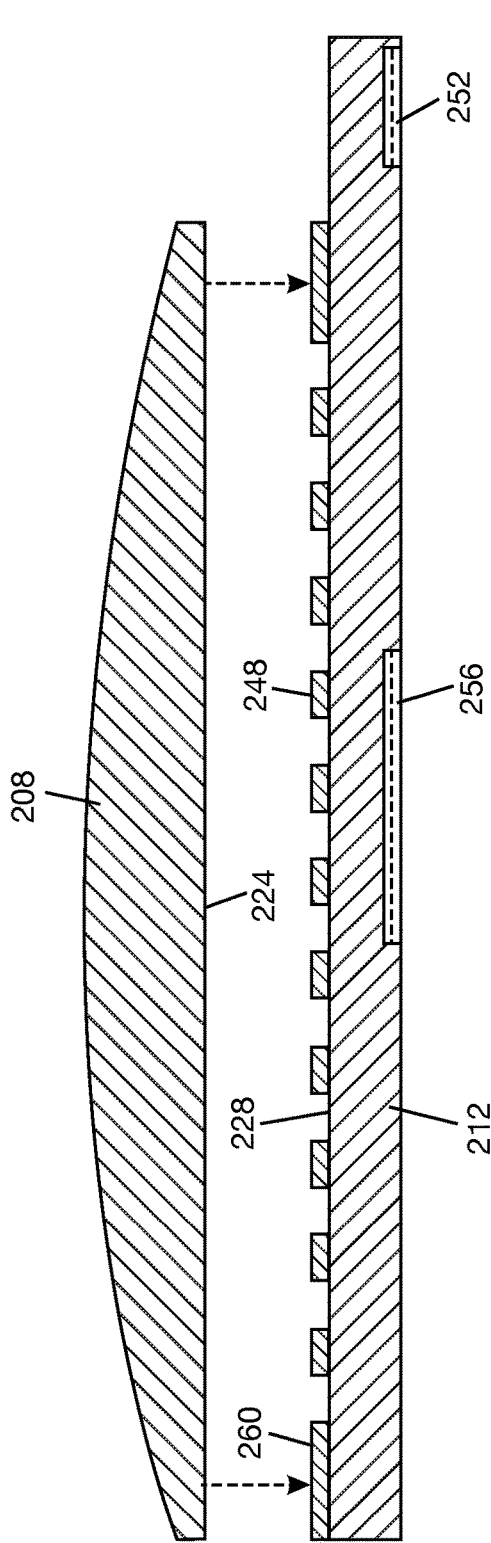
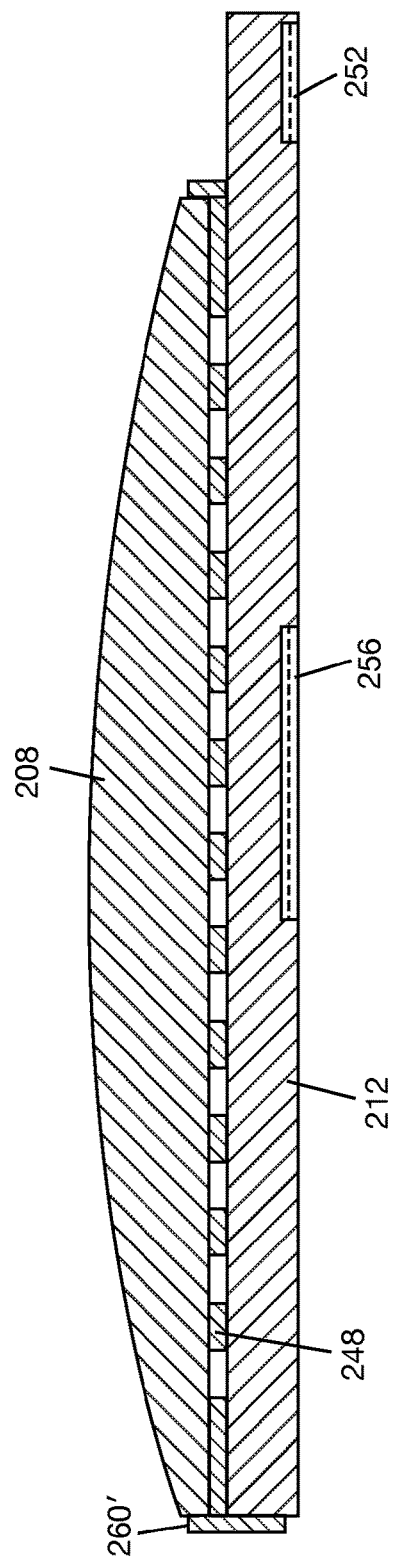

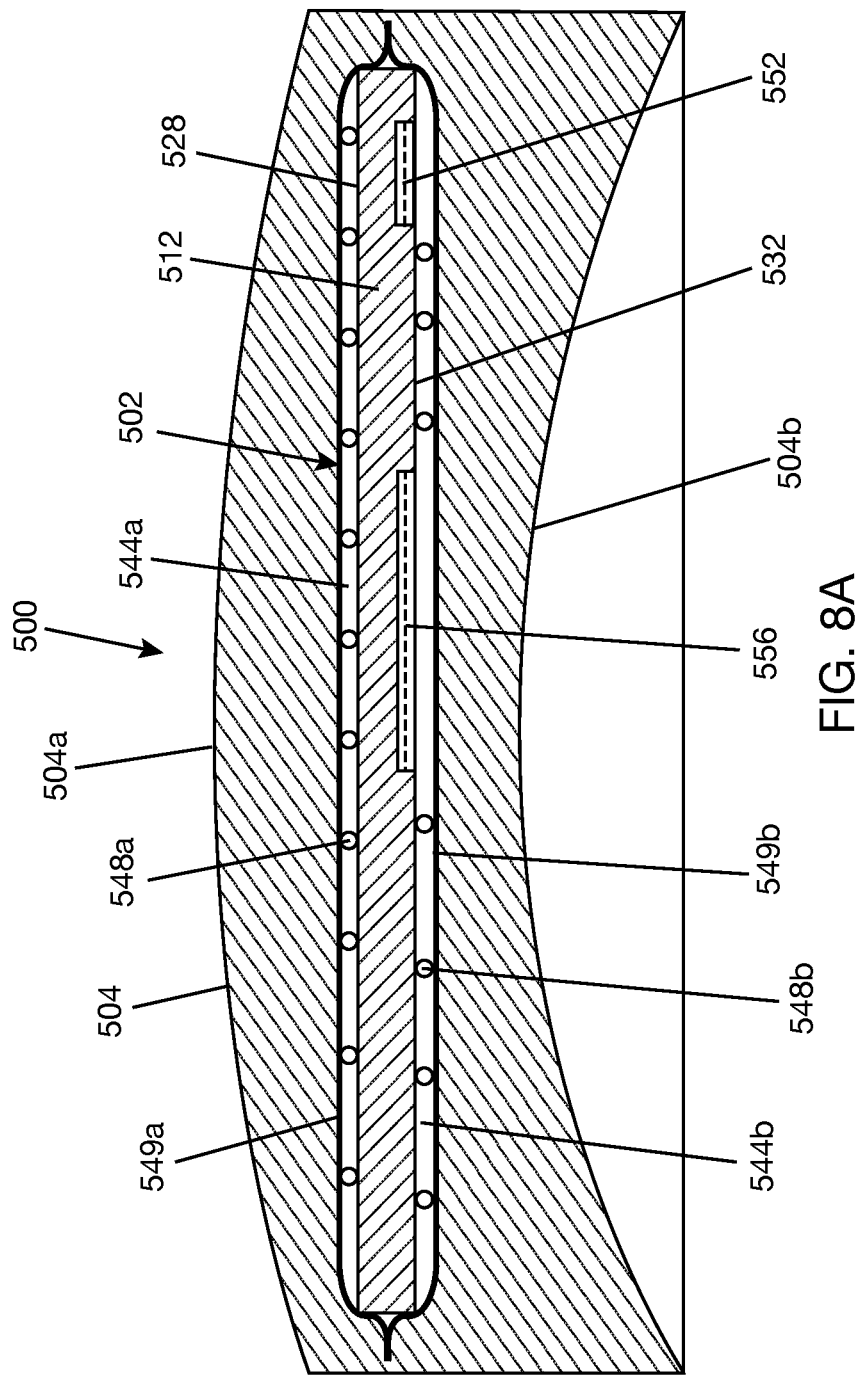

OPTICAL COMBINER LENS WITH SPACERS BETWEEN LENS AND LIGHTGUIDE

CROSS-REFERENCE TO RELATED APPLICATIONS

This application claims the benefit of U.S. Provisional Application No. 62/754,339, filed 1 Nov. 2018, U.S. Provisional Application No. 62/782,918, filed 20 Dec. 2018, U.S. Provisional Application No. 62/789,909, filed 8 Jan. 2019, U.S. Provisional Application No. 62/845,956, filed 10 May 2019, the disclosures of which are incorporated herein in their entirety by reference.

TECHNICAL FIELD

The disclosure relates generally to optical combiners and particularly to integration of optical combiners in lenses and use of such optical combiner lenses in wearable heads-up displays.

BACKGROUND

Wearable heads-up displays use optical combiners to combine real world and virtual images. There are two main classes of optical combiners used in wearable heads-up displays: free-space combiners and substrate-guided combiners. Free-space combiners use one or more reflective, refractive, or diffractive optical elements to redirect light from a light source to a target. In substrate-guided combiners, light enters a guide substrate, e.g., a waveguide or lightguide, typically through an in-coupling element, propagates along the length of the guide substrate by total internal reflection, and exits the guide substrate, typically through an out-coupling element. There may be additional optical elements in the guide substrate to redirect light, e.g., reflect, refract, or diffract light, within the guide substrate. In wearable heads-up displays having the form of glasses, the optical combiners are integrated into at least one eyeglass, which may or may not be a prescription eyeglass. Despite the advances in the field of head-mounted displays, it remains a challenge to manufacture a wearable heads-up display that provides a sufficient field of view, that can include eyeglasses prescription if needed, and that is not too bulky and/or too heavy to be worn on the head for prolonged periods.

SUMMARY

In a first aspect, an optical combiner lens may be summarized as including a lens having an outer lens surface and an inner lens surface; a lightguide in a stack with the lens, the lightguide having a top lightguide surface and a bottom lightguide surface, the top lightguide surface in opposing relation to the inner lens surface with a gap defined between the top lightguide surface and the inner lens surface; and a plurality of spacers disposed in the gap to maintain the gap at a set height.

Variants of the optical combiner lens according to the first aspect may further include one or more of the features described in A1 to A20 below.

A1: The set height of the gap may be at least 2 microns.
A2: The set height of the gap may be in a range from 2 microns to 100 microns.
A3: The spacers may be microbeads.
A4: The spacers may be micropillars.
A5: At least some of the spacers may extend between and contact both of the inner lens surface and the first lightguide surface.
A6: At least some of the spacers have different heights.
A7: The spacers may comprise silica.
A8: The spacers may comprise a plastic material.
A9: The gap may contain a medium in spaces between and around the spacers, where the medium has a refractive index that is lower than a refractive index of the lightguide.
A10: A concentration of the spacers on the top lightguide surface may be in a range from 1 to 100 spacers per $mm^2$.
A11: A distribution of the spacers across the gap may be nonuniform.
A12: The lightguide has an input zone at which light enters the lightguide, an output zone from which light exits the lightguide, and a propagation zone between the input zone and the output zone that provides a propagation path for light from the input zone to the output zone. The top lightguide surface has a first area coinciding with at least one of the input zone, the output zone, and the propagation zone of the lightguide and a second area outside of the first area. A concentration of the spacers on the first area may be lower than a concentration of the spacers on the second area. In some cases, the concentration of the spacers in the first area may be zero.
A13: An adhesive layer may be applied to at least one of the inner lens surface and the top lightguide surface, where at least some of the spacers contact the adhesive layer and are retained in place in the gap by the adhesive layer.
A14: A deformable layer may be formed on the top lightguide surface, where at least some of the spacers are pressed into the deformable layer and retained in place in the gap by the deformable layer.
A15: An output coupler may be positioned to couple light out of the lightguide. The output coupler may be a grating.
A16: An input coupler may be positioned to couple light into the lightguide. The input coupler may be a grating or a prism.
A17: The lens may be a planoconvex lens or a meniscus lens.
A18: The lightguide may be a planar lightguide.
A19: A seal engages the lens and the lightguide and circumscribes the gap.
A20: The lightguide has a side edge extending from a perimeter of the top lightguide surface to a perimeter of the bottom lightguide surface, where at least a portion of the seal wraps around at least a portion of the side edge of the lightguide. The at least a portion of the seal may include nanoparticles that absorb and/or scatter light. At least a portion of the side edge may have an edge treatment selected from a shaped edge, a coated edge, a roughened edge, a polished edge, and an etched edge.

In a second aspect, a wearable heads-up display may be summarized as including a support structure, a display light source coupled to the support structure, and an optical combiner lens according to the first aspect (or a variant thereof) coupled to the support structure.

In a third aspect, a method of making an optical combiner lens may be summarized as including mixing a plurality of microbeads into a liquid carrier; coating one of a first surface of a lens and a first surface of a lightguide with the mixture; allowing the liquid carrier to evaporate from the surface, leaving the microbeads on the respective first surface; bringing the first surface of the lens and the first surface of the lightguide together to trap the microbeads between the lens and lightguide; and securing the lens and the lightguide together with the microbeads trapped between the lens and the lightguide.

Variants of the method of making an optical combiner lens according to the third aspect may further include one or more of the features described in B1 to B5 below.

B1: An adhesive layer may be formed on at least a portion of one of the first surface of the lens and the first surface of the lightguide, and the microbeads may be contacted with the adhesive layer.

B2: An adhesive layer may be formed on at least a portion of one of the first surface of the lens and the first surface of the lightguide before coating one of a first surface of a lens and a first surface of a lightguide with the mixture. Coating one of a first surface of a lens and a first surface of a lightguide with the mixture may include depositing the mixture on the adhesive layer.

B3: A deformable layer may be formed on one of the first surface of the lens and the first surface of the lightguide. Bringing the first surface of the lens and the first surface of the lightguide together to trap the microbeads between the lens and the lightguide may include applying a pressure to at least one of the lens and lightguide, thereby pressing the microbeads into the deformable layer.

B4: Securing the lens and the lightguide together may include forming a seal between the lens and the lightguide.

B5: Securing the lens and the lightguide together may include forming a seal that wraps around a side edge of the lens and at least a portion of a side edge of the lightguide.

The foregoing general description and the following detailed description are exemplary of the invention and are intended to provide an overview or framework for understanding the nature of the invention as it is claimed. The accompanying drawings are included to provide further understanding of the invention and are incorporated in and constitute part of this specification. The drawings illustrate various embodiments of the invention and together with the description serve to explain the principles and operation of the invention.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIG. 1A is a cross-sectional view of an optical combiner lens including a lens, a lightguide, and microbead spacers in a medium gap between the lens and the lightguide.

FIG. 1B is a cross-sectional view of an optical combiner lens including a lens, a lightguide without an extension tab, and microbead spacers in a medium gap between the lens and the lightguide.

FIG. 1G is a cross-sectional view of an optical combiner lens including a planoconvex lens, a lightguide, and spacers in a medium gap between the lens and the lightguide, where the lens and lightguide are held together by a seal that wraps around the lens and the lightguide.

FIG. 1H is a cross-sectional view of an optical combiner lens including a meniscus lens, a lightguide, and spacers in a medium gap between the lens and the lightguide, where the lens and lightguide are held together by a seal that wraps around the lens and the lightguide.

FIG. 3D is a cross-sectional view showing a lens advancing towards the microbeads deposited on the adhesive layer of the lightguide of FIG. 3C.

FIG. 3E is a cross-sectional view showing an adhesive layer formed on a lens surface and the lens surface advancing towards microbeads deposited on a top surface of a lightguide.

FIG. 5B is a cross-sectional view showing a mold with a micropillar topological pattern brought into contact with the resist layer on the lightguide of FIG. 5A.

FIG. 5C is a cross-sectional view showing the mold of FIG. 5B pressed into the resist layer on the lightguide of FIG. 5A.

FIG. 5F is a cross-sectional view showing a lens advancing towards the micropillars of FIG. 5E.

FIG. 5G is a cross-sectional view showing micropillars between a lens and a lightguide and a seal wrapped around side edges of the lens and the lightguide.

FIG. 8A is a cross-sectional view of an optical combiner lens including a lightguide assembly embedded in a lens.

DETAILED DESCRIPTION

Figure 1C:
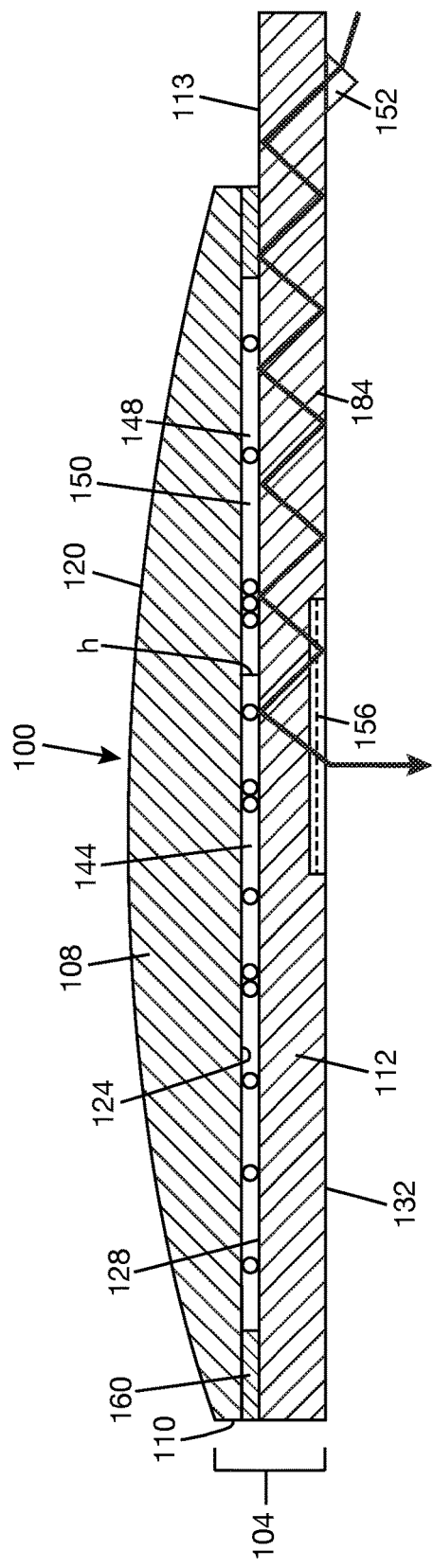
FIG. 1C is a cross-sectional view of an optical combiner lens including a lens, a lightguide, and microbead spacers in a medium gap between the lens and the lightguide, where a prism input coupler is optically coupled to the lightguide.

In the following description, certain specific details are set forth in order to provide a thorough understanding of various disclosed implementations and embodiments. However, one skilled in the relevant art will recognize that implementations and embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the implementations or embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise. For the sake of continuity and conciseness, the same reference numbers may appear in multiple figures where they refer to the same features.

In this disclosure, unless the context requires otherwise, throughout the specification and claims which follow, the word "comprise" and variations thereof, such as, "comprises" and "comprising" are to be construed in an open, inclusive sense, that is as "including, but not limited to."

In this disclosure, reference to "one implementation" or "an implementation" or to "one embodiment" or "an embodiment" means that a particular feature, structures, or characteristics may be combined in any suitable manner in one or more implementations or one or more embodiments.

In this disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the disclosure provided herein are for convenience only and do not interpret the scope or meaning of the embodiments.

FIG. 1A shows an optical combiner lens 100 according to one illustrative implementation. Optical combiner lens 100 includes a lens 108 and a lightguide 112 arranged to form a stack 104. Lens 108 has an outer lens surface 120, an inner lens surface 124, and lens material 126 between lens surfaces 120, 124. Any suitable lens material, such as plastic, e.g., polycarbonate, or glass, may be used as lens material 126. In general, lens material 126 is transparent to at least some optical wavelengths of electromagnetic energy, e.g., wavelengths in the visible range. In the illustrated example of FIG. 1A, lens 108 is a planoconvex lens, where outer lens surface 120 is a convex surface and inner lens surface 124 is flat or planar. In other examples, lens 108 may be a different type of lens, such as a meniscus lens (see lens 108' in FIG. 1E).

Lightguide 112 is an optical element using total internal reflection to transfer collimated light. For display applications, the collimated light may be an image, and lightguide 112 may transfer and replicate the image to an eye of a user. In the illustrated example, lightguide 112 has a top lightguide surface 128, a bottom lightguide surface 132, and lightguide material 134 between top lightguide surface 128 and bottom lightguide surface 132. Lightguide material 134 may be a piece of material that is capable of transmitting light coupled into the material. Preferably, lightguide material 134 is transparent to at least some wavelengths of electromagnetic energy, e.g., wavelengths in the visible range. In some examples, lightguide material 134 may be made of lens material as described above for lens material 126. Lightguide material 134 and lens material 126 could be the same material or may be different materials. In one implementation, lightguide 112 is a planar lightguide, where both lightguide surfaces 128, 132 are planar or flat. In other examples not shown, lightguide 112 may be a curved lightguide, where either of lightguide surfaces 128, 132 may be a curved surface, i.e., not lying flat or not in a plane, or a combination of curved and planar surfaces. In another example not shown, lightguide 112 may be a waveguide comprised of a core between two claddings, where the core has a higher refractive index compared to the claddings and light propagates within the core. The waveguide may be a slab or planar waveguide.

In the stacked arrangement of lens 108 and lightguide 112 shown in FIG. 1A, inner lens surface 124 is in opposing relation to top lightguide surface 128. Outer lens surface 120 is the world side of optical combiner lens 100, and bottom lightguide surface 132 is the eye side of optical combiner lens 100. A curvature of outer lens surface 120 may be selected to achieve a select eyeglasses prescription and/or to achieve other combiner lens function, such as displaying an image at a particular distance in front of the combiner lens. One or more coatings, such as anti-scratch coating, anti-reflective coating, and/or IR-blocking coating, may be selectively applied to any of lens surfaces 120, 124 and lightguide surfaces 128, 132.

In one implementation, light is coupled into lightguide 112 through an input coupler 152 that is optically coupled to lightguide 112. Input coupler 152 may be attached to lightguide 112, integrally formed with lightguide 112, embedded in top or bottom lightguide surface 128, 132, or otherwise physically coupled to lightguide 112. In the example shown in FIG. 1A, input coupler 152 is physically coupled to an extension tab 113 of lightguide 112. Extension tab 113 is a portion of lightguide 112 that extends past a periphery of lens 108, which means that input coupler 152 is not in a portion of lightguide 112 that is aligned with or in registration with lens 108. FIG. 1B shows an example where lightguide 112' does not have an extension tab. In this case, input coupler 152 could be in a portion of lightguide 112' that is aligned with or in registration with lens 108, as shown.

In one example, input coupler 152 may be any type of optical grating structure including, but not limited to, diffraction gratings, holograms, holographic optical elements (e.g., optical elements using one or more holograms), volume diffraction gratings, volume holograms, surface relief diffraction gratings, and/or surface relief holograms. Input coupler 156 may be of the transmission type, meaning the coupler transmits light and applies designed optical function(s) to the light during the transmission, or of the reflection type, meaning the coupler reflects light and applies designed optical function(s) to the light during the reflection. For illustration purposes, input coupler 152 is shown as a transmission coupler in FIGS. 1A and 1B. In another example, input coupler 152 may be a non-grating structure. For example, as shown in FIG. 1C, input coupler 152 may be a prism.

Figure 1D:
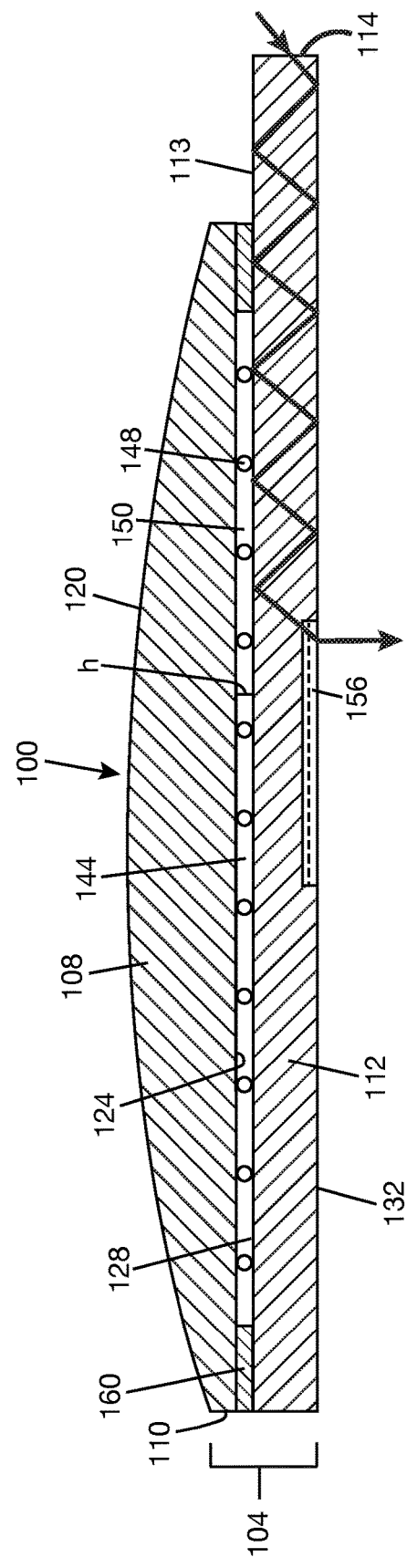
FIG. 1D is a cross-sectional view of an optical combiner lens including a lens, a lightguide, and spacers in a medium gap between the lens and the lightguide, where light is coupled into the lightguide through an input edge of the lightguide.

In another implementation, light may be coupled into lightguide 112 without an input coupler. Referring to FIG. 1D, light may be coupled into lightguide 112 through an input edge 114 of lightguide 112. Input edge 114 is a portion of a side edge 117 of lightguide 112, where side edge 117 of lightguide 112 is a surface of lightguide 112 extending between a perimeter of top lightguide surface 128 and a perimeter of bottom lightguide surface 132. In the example shown in FIG. 1D, input edge 114 is located on extension tab 113 of lightguide 112. If lightguide 112 does not have an extension tab, input edge 114 would be on a portion of lightguide 112 that is aligned with or in registration with lens 108. In other words, edge coupling is not limited to an example where lightguide 112 has an extension tab.

Referring to FIGS. 1A-1D, light is coupled out of lightguide 112 through an output coupler 156 that is optically coupled to lightguide 112. Output coupler 156 may be attached to lightguide 112, integrally formed with lightguide 112, embedded in top or bottom lightguide surface 128, 132, or otherwise physically coupled to lightguide 112. In one example, output coupler 156 may be any type of optical grating structure including, but not limited to, diffraction gratings, holograms, holographic optical elements (e.g., optical elements using one or more holograms), volume diffraction gratings, volume holograms, surface relief diffraction gratings, and/or surface relief holograms. Output coupler 156 may be of the transmission type or of the reflection type. For illustration purposes, FIGS. 1A-1D show output coupler 156 as a transmission coupler.

Returning to FIG. 1A, a medium gap 144 is defined within stack 104 and between inner lens surface 124 and top lightguide surface 128. Spacers 148 are interposed between inner lens surface 124 and top lightguide surface 128 to maintain medium gap 144 at some height h>0. The height of medium gap 144 may be uniform across stack 104 or may vary across stack 104, e.g., due to localized sagging of lens 108 or lightguide 112 or due to inner lens surface 124 and/or top lightguide surface 128 not being flat or perfectly flat or due to inner lens surface 124 and top lightguide surface 128 not being parallel to each other. To maintain medium gap 144 at height h>0, some or all of the spacers 148 may contact one or both of inner lens surface 124 and top lightguide surface 128. Spaces 150 around and in between spacers 148, and within medium gap 144, contain a medium, hence the term "medium" used with medium gap 144. In one example, the medium in spaces 150 may be air or other gaseous material (or inert gas), such as nitrogen. In other examples, the medium may be a liquid material at room temperatures or a solid material at room temperatures. In one example, the refractive index $n_1$ of the medium in medium gap spaces 150 is substantially different from, e.g., less than, the refractive index $n_2$ of lightguide 112, which allows light received through input coupler 152 (or input edge 114 of lightguide 112) to travel along lightguide 112 to output coupler 156 by total internal reflection.

Evanescent coupling of light between lightguide 112 and lens 108 through the medium in spaces 150 may be minimized by an appropriate selection of the height of medium gap 144. In general, evanescent coupling depends exponentially on the height of medium gap 144, decreasing as height increases. A threshold height for medium gap 144 can be found above which evanescent coupling between lightguide 112 and lens 108 will be minimal or insignificant. Spacers 148 can be selected to maintain medium gap 144 at or above the threshold height. In one implementation, the threshold height for medium gap 144 could be 2 microns. As examples, height h of medium gap 144 may be in a range from 2 to 100 microns, or in a range from 2 to 50 microns, or in a range from 2 microns to 10 microns, or in a range from 2 microns to 6 microns, or in a range from 2 microns to 4 microns.

In the illustrated examples of FIGS. 1A-1D, each spacer 148 is a round microparticle ("microbead"). Spacers 148 may be made of inorganic material, such as silica or polymer, e.g., poly(methyl metaacrylate) (PMMA). Preferably, the material of spacer 148 is transparent so as to achieve an overall transparency of optical combiner lens 100. The diameters (or heights) of spacers 148 may be selected to set height h of medium gap 144 at or above the threshold height. In one example, each spacer 148 may have a height (or diameter) in a range from 2 to 100 microns, or in a range from 2 microns to 50 microns, or in a range from 2 microns to 10 microns, or in a range from 2 microns to 6 microns, or in a range from 2 microns to 4 microns. The refractive index of each spacer 148 may be $n_1$ (refractive index of lens 108) or $n_2$ (refractive index of lightguide 112) or may be different from $n_1$ and $n_2$. Microbeads 148 may be in a monolayer on top lightguide surface 128, or some of the microbeads 148 may be stacked within medium gap 144. Microbeads 148 may be scattered across top lightguide surface 128 or may be regionally concentrated (in regions with different concentrations) on top lightguide surface 128. Localized clustering of microbeads 148 on top lightguide surface 128 may occur due to attraction forces between the microbeads. Localized clustering may occur whether microbeads 148 are scattered across top lightguide surface 128 or regionally concentrated on top lightguide surface 128.

When light encounters microbeads (or spacers) 148 on top lightguide surface 128, there will be scattering of the light by microbeads 148. The concentration of microbeads 148 on top lightguide surface 128 may be selected to minimize perception of the scattered light at lens 108. In general, the lower the concentration of microbeads 148 on top lightguide surface 128, the lower the perception of light scattering will be. However, there should be a sufficient number of microbeads 148 to maintain medium gap 144 within stack 104. In one example, the concentration of microbeads 148 on top lightguide surface 128, e.g., the number of microbeads 148 divided by the area of top lightguide surface 128 exposed to medium gap 144, may be in a range from 1 to 100 $mm^2$, or in a range from 1 to 50 $mm^2$, or in a range from 1 to 15 microbeads per $mm^2$, or in a range from 5 to 15 microbeads per $mm^2$, or in a range from 4 to 12 microbeads per $mm^2$, where the sizes of the microbeads may be as described above. In general, the microbead concentration can be selected based on what would minimize perception of scattered light at lens 108.

Figure 1E:
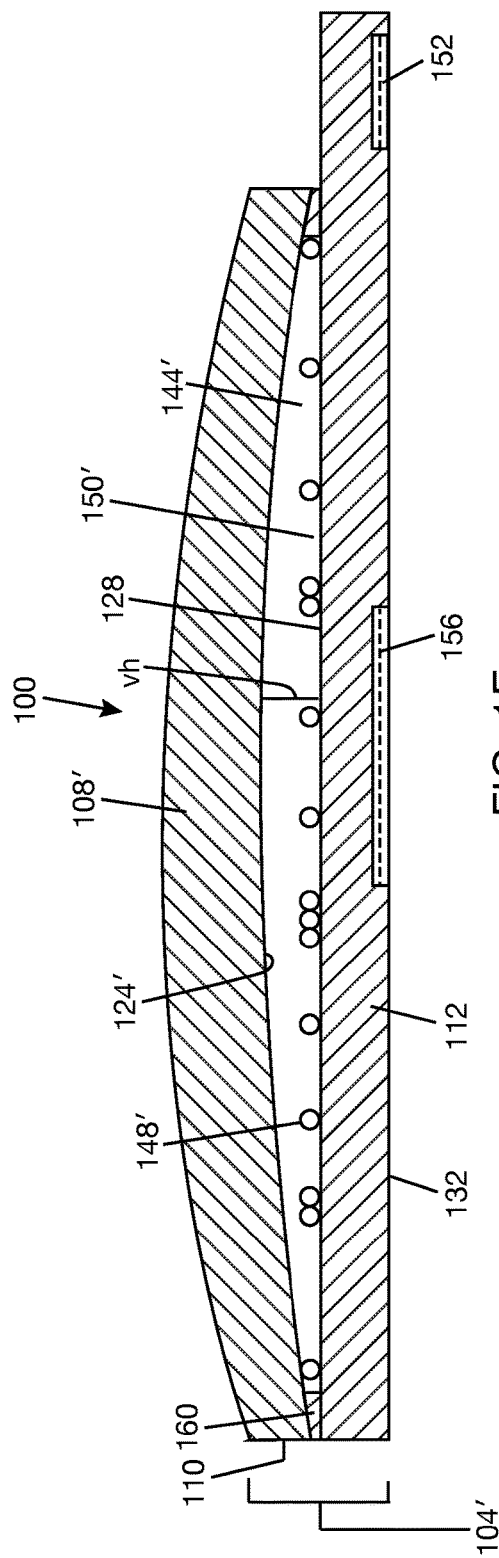
FIG. 1E is a cross-sectional view of an optical combiner lens including a meniscus lens, a lightguide, and microbead spacers in a medium gap between the meniscus lens and the lightguide.

In the illustrated examples of FIGS. 1A-1D, lens 108 is a planoconvex lens, lightguide 112 is a planar lightguide, and inner lens surface 124 is generally parallel to top lightguide surface 128 so that medium gap 144 generally has a uniform height h across the stack. In this case, microbeads 148 with height (or diameter) h will maintain medium gap 144 at a generally uniform height h across the stack. There may be localized variations in height h of medium gap 144 depending on flatness of inner lens surface 124 and top lightguide surface 128 and/or tolerances in heights of spacers 148. FIG. 1E shows an example where a meniscus lens 108' and lightguide 112 forms a stack 104'. Medium gap 144' is defined between an inner lens surface 124' of meniscus lens 108' that is curved and top lightguide surface 128 that is planar. As a result, medium gap 144' has a variable height vh across stack 104'. As illustrated, if microbeads 148' of same height are in a monolayer in medium gap 144', some of microbeads 148 will be wedged between inner lens surface 124' and top lightguide surface 128 while others of the microbeads 148 will contact only one of top lightguide surface 128 and inner lens surface 124'. In this example, medium gap 144' would still be maintained within stack 104' in that microbeads 148, being between inner lens surface 124' and top lightguide surface 128, will act as physical barriers between inner lens surface 124' and top lightguide surface 128.

Figure 1F:
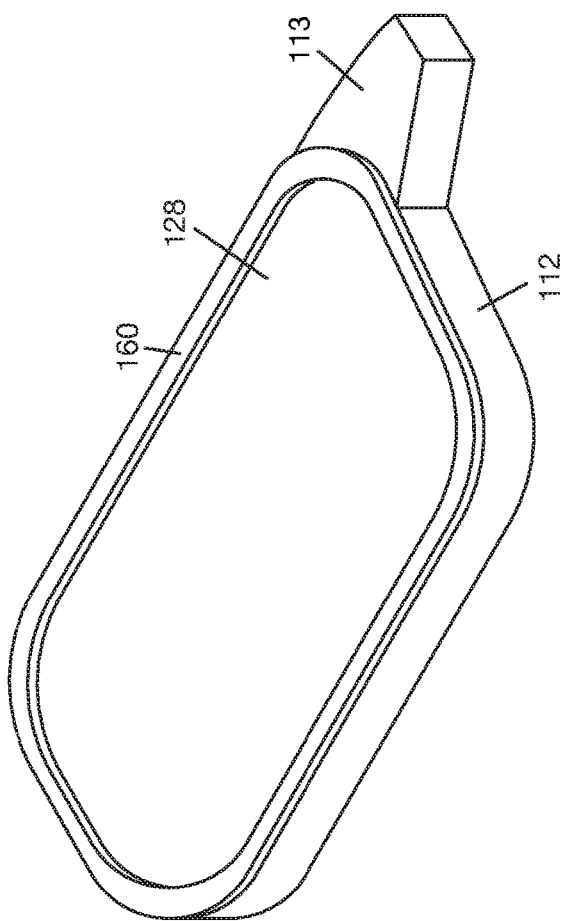
FIG. 1F is an isometric view of a seal on a top surface of a lightguide.

In the illustrated examples of FIGS. 1A-1E, lens 108 (108') and lightguide 112 are held together by a seal 160. Seal 160 is interposed between lens 108 (108') and lightguide 112 and engages an adjacent portion of inner lens surface 124 (124') and an adjacent portion of top lightguide surface 128. In one implementation, seal 160 has a closed loop shape, as illustrated in FIG. 1F, and is located proximate a periphery 110 of stack 104 (104'). In this position and with this shape, seal 160 circumscribes medium gap 144 (144') and may provide medium gap 144 (144') with a hermetic seal proximate periphery 110 of stack 104 (104'). Seal 160 may be made of one or more non-porous or impermeable materials to provide medium gap 144 (144') with the hermetic seal. In some examples, seal 160 may be made of a curable material, such as a UV curable resin, or may be a double-sided adhesive pad, or may be other suitable sealing material or structure.

Figure 1I:
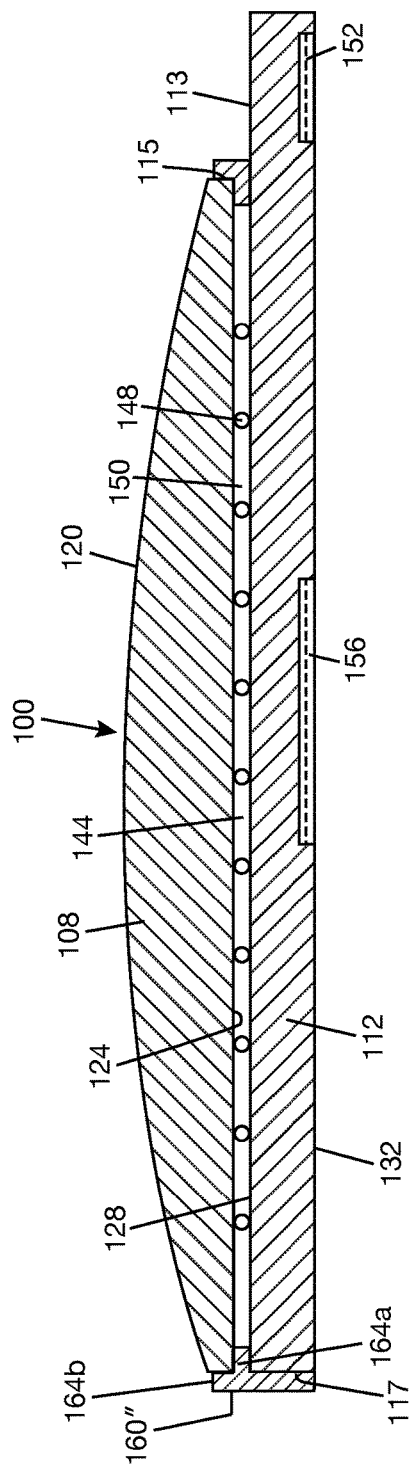
FIG. 1I is a cross-sectional view of an optical combiner lens including a lens, a lightguide, and spacers in a medium gap between the lens and the lightguide, where the lens and the lightguide are held together by a seal having an inner portion between the lens and lightguide and an outer portion that wraps around the lens and lightguide.

Other seal structures for holding lens 108 (108') and lightguide 112 together are possible. FIGS. 1G and 1H show a seal 160' that holds lens 108 (108') and lightguide 112 together by wrapping around a side edge 115 (115') of lens 108 (108') and a side edge 117 of a portion of lightguide 112 that is aligned with (or in registration with) lens 108. Seal 160' engages the side edges of lens 108 (108') and lightguide 112. In the example where lightguide 112 has extension tab 113, seal 160' includes a slot 162 to accommodate extension tab 113. Thus, seal 160' may engage a portion of top lightguide surface 128 at the slot 162 as shown in FIGS. 1G and 1H. Seal 160' could be used with a lens 108 that is a planoconvex lens (in FIG. 1G) or a lens 108' that is a meniscus lens (in FIG. 1H). FIG. 1I shows a seal 160" that includes an inner portion 164a interposed between lens 108 and lightguide 112, in much the same way as described for seal 160 above, and an outer portion 164b that wraps around lens 108 and lightguide 112, in much the same way as described for seal 160' above. Any of seals 160' and 160" could also be used with the example of FIG. 1B where lightguide 112' does not have an extension tab.

Figure 1J:
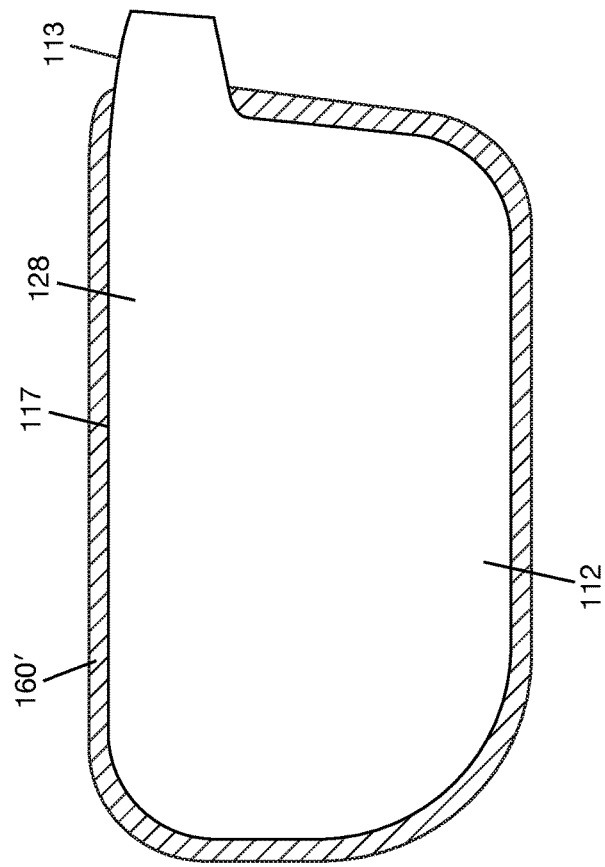
FIG. 1J is a cross-sectional view of a seal that wraps around a side edge of a lightguide.

Light propagating inside lightguide 112 that is not coupled into output coupler 152 may emerge at side edge 117 of lightguide 112 as stray light. To manage the stray light, a seal engaging side edge 117 of lightguide 112 may double up as a light dump for lightguide 112. For example, FIG. 1J shows seal 160' (previously shown in FIGS. 1G and 1H) wrapped around a side edge 117 of a portion of lightguide 112 that would be in registration with lens 108 (see FIGS. 1G and 1H). Light from lightguide 112 reaching a portion of side edge 117 where seal 160' is located will be dumped into seal 160', where seal 160' could absorb and/or scatter the dumped light. In one example, nanoparticles, e.g., silver nanoparticles and the like, may be incorporated into seal 160' to assist seal 160' with absorbing and/or scattering the light dumped by lightguide 112. In general, a seal engaging any portion of side edge 117 of lightguide 112 (e.g., seal 160' in FIGS. 1G and 1H or seal 160" in FIG. 1I) may function as a light dump for lightguide 112 and may incorporate nanoparticles as described above. Although not shown in the drawings, any seal engaging side edge 117' of lightguide 112' (in FIG. 1B) may also function as a light dump as described above.

Figure 1K:
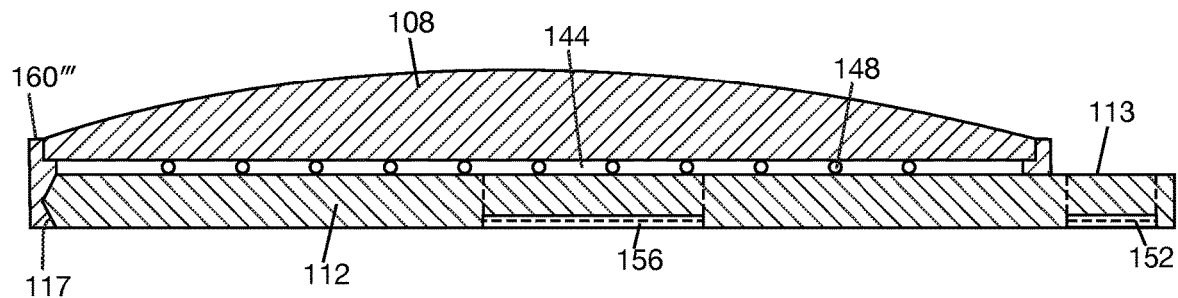
FIG. 1K is a cross-sectional view of an optical combiner lens including a lens, a lightguide, and spacers in a medium gap between the lens and the lightguide, where a side edge of the lightguide is double-beveled and the lens and lightguide are held together by a seal that wraps around the lens and the lightguide.
Figure 1L:
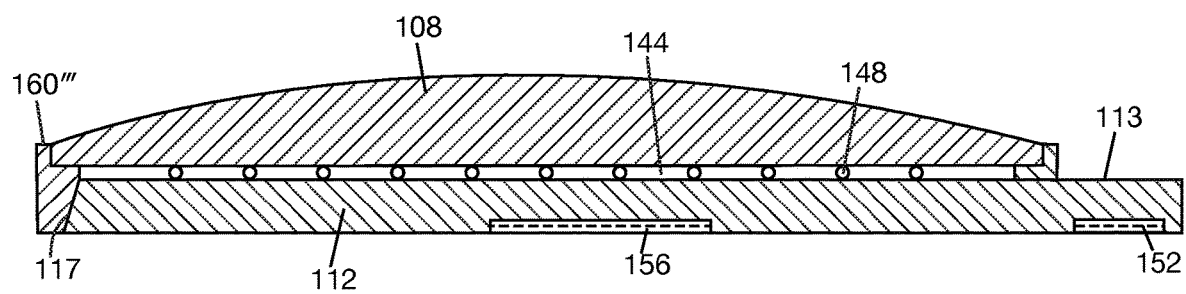
FIG. 1L is a cross-sectional view of an optical combiner lens including a lens, a lightguide, and spacers in a medium gap between the lens and the lightguide, where a side edge of the lightguide is beveled and the lens and lightguide are held together by a seal that wraps around the lens and the lightguide.
Figure 1M:
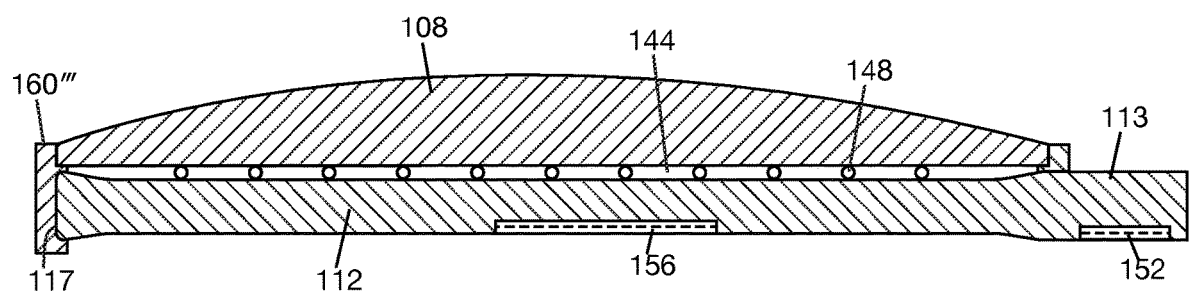
FIG. 1M is a cross-sectional view of an optical combiner lens including a lens, a lightguide, spacers in a medium gap between the lens and the lightguide, where a side edge of the lightguide is formed into a flange and the lens and lightguide are held together by a seal that wraps around the lens and the lightguide.

In one implementation, side edge 117 may be shaped to facilitate coupling of stray light from lightguide 112 into an adjacent seal. FIGS. 1K and 1L show examples where side edge 117, or a portion thereof, is beveled or includes angled surface(s). In the illustrated examples, the bevel edge treatment is applied to a portion of side edge 117 on a portion of lightguide 112 that is aligned with lens 108. In other examples, the bevel edge treatment may be extended to the portion of side edge 117 on extension tab 113 of lightguide 112. FIG. 1M shows an example where side edge 117 is formed into a flange. In FIGS. 1K, 1L, and 1M, seal 160''' adjacent to side edge 117 may be suitably shaped to conform to the shape of side edge 117 and may have properties to function as a light dump as previously described. Other edge shapes for side edge 117 are possible, such as convex shape, bullnose shape, chamfer shape, and the like. Other edge treatments that include modifying a surface of side edge 117, such as applying a coating to side edge 117, polishing side edge 117, etching side edge 117, or roughening side edge 117, may be used in lieu of or in addition to edge shaping treatment.

Figure 2A:
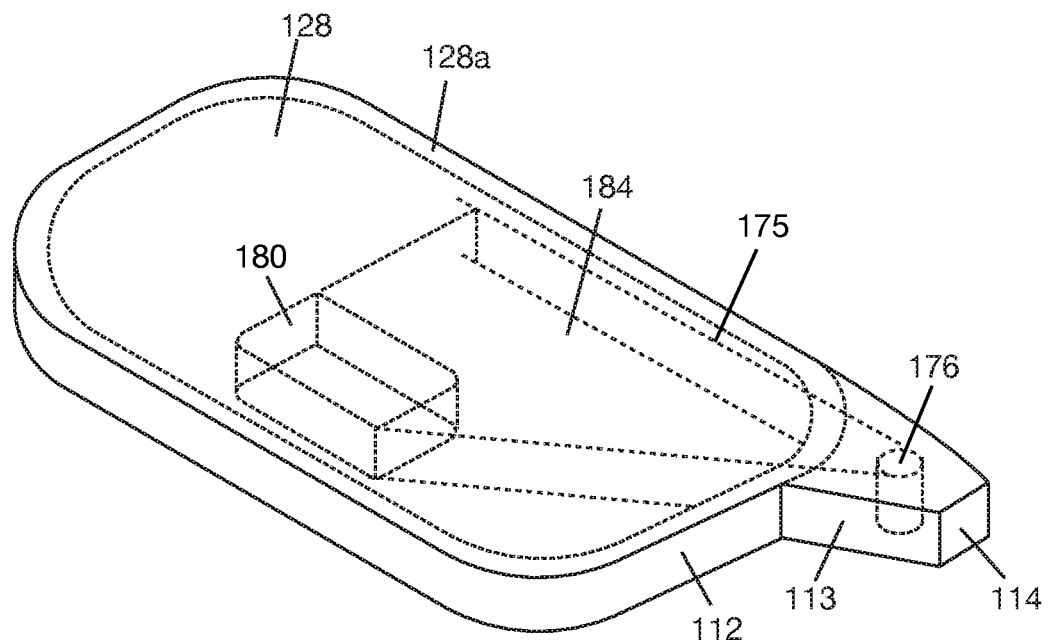
FIG. 2A is an isometric view of a lightguide showing input zone, output zone, and propagation zone of the lightguide, where the input zone is located on an extension tab of the lightguide.
Figure 2B:
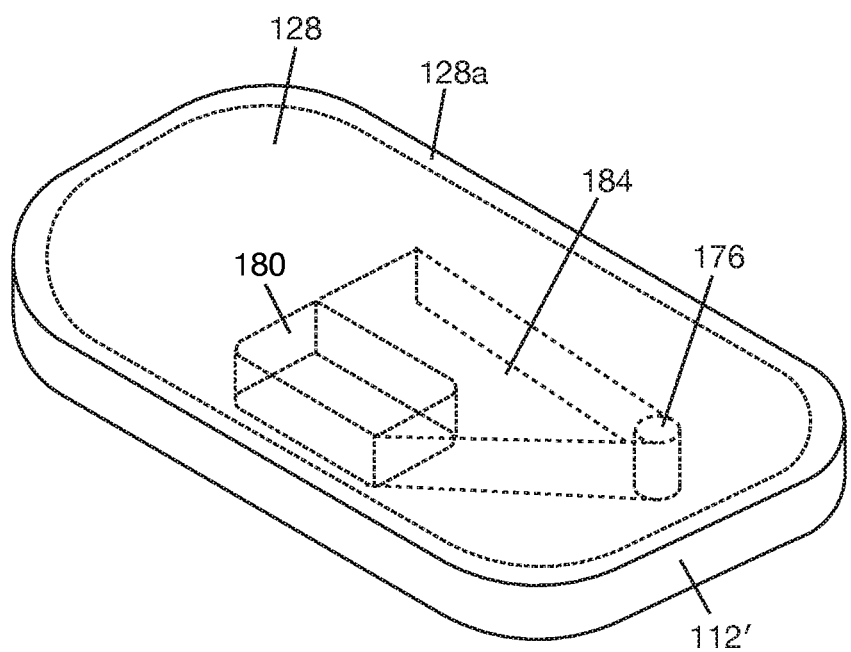
FIG. 2B is an isometric view of a lightguide showing input zone, output zone, and propagation zone of the lightguide, where the lightguide does not have an extension tab.

FIG. 2A illustrates lightguide 112 with an input zone 176, an output zone 180, and a propagation zone 184. Input zone 176 is where lightguide 112 receives light. Input zone 176 may be a portion of lightguide 112 that is aligned with or in registration with input coupler 152 (in FIG. 1A). If light is coupled into lightguide 112 through input edge 114, then input zone 176 will coincide with input edge 114. Output zone 180 is where light exits lightguide 112. Output zone 180 is a portion of lightguide 112 that is aligned with or in registration with output coupler 156 (in FIG. 1A). Propagation zone 184 is a portion of lightguide 112 between input zone 176 and output zone 180. Propagation zone 184 provides a propagation path for light from input zone 176 to output zone 180. In the example shown in FIG. 2A, input zone 176 is located in extension tab 113 of lightguide 112. FIG. 2B shows an example location of input zone 176 for lightguide 112' that does not have an extension tab.

Figure 2C:
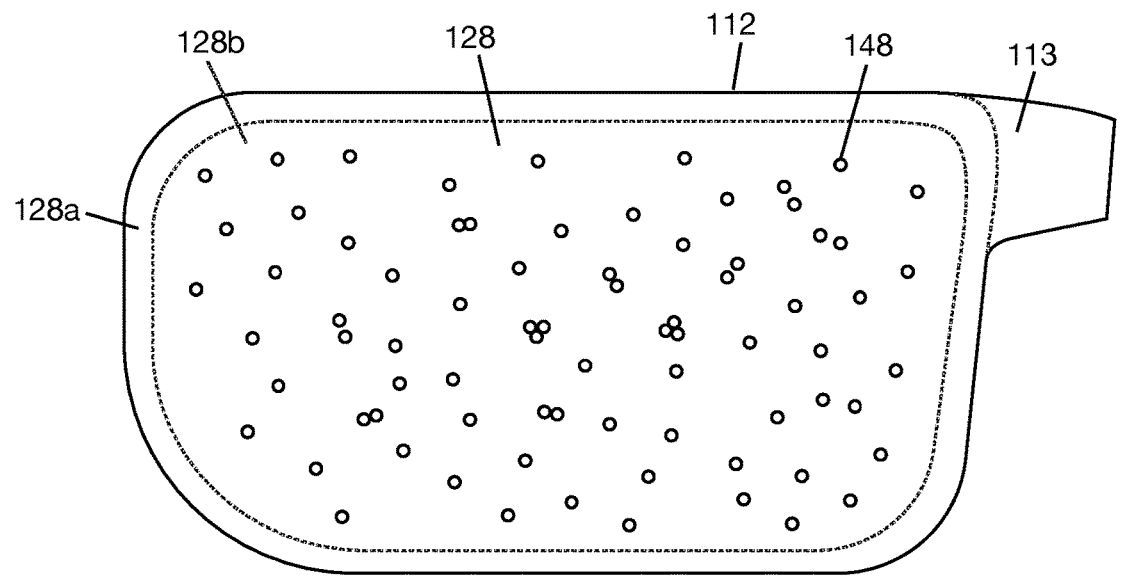
FIG. 2C is a top view of a lightguide showing microbeads scattered across a top surface of the lightguide.
Figure 2D:
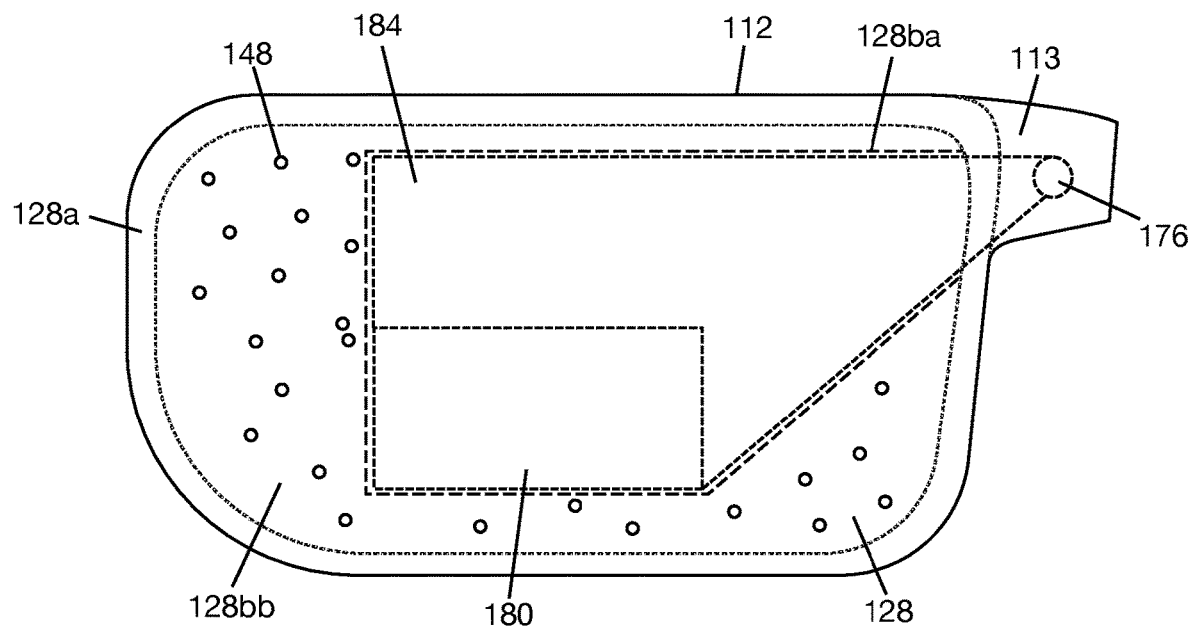
FIG. 2D is a top view of a lightguide showing microbeads excluded from a select area of a top surface of the lightguide, where the lightguide has an extension tab.
Figure 2E:
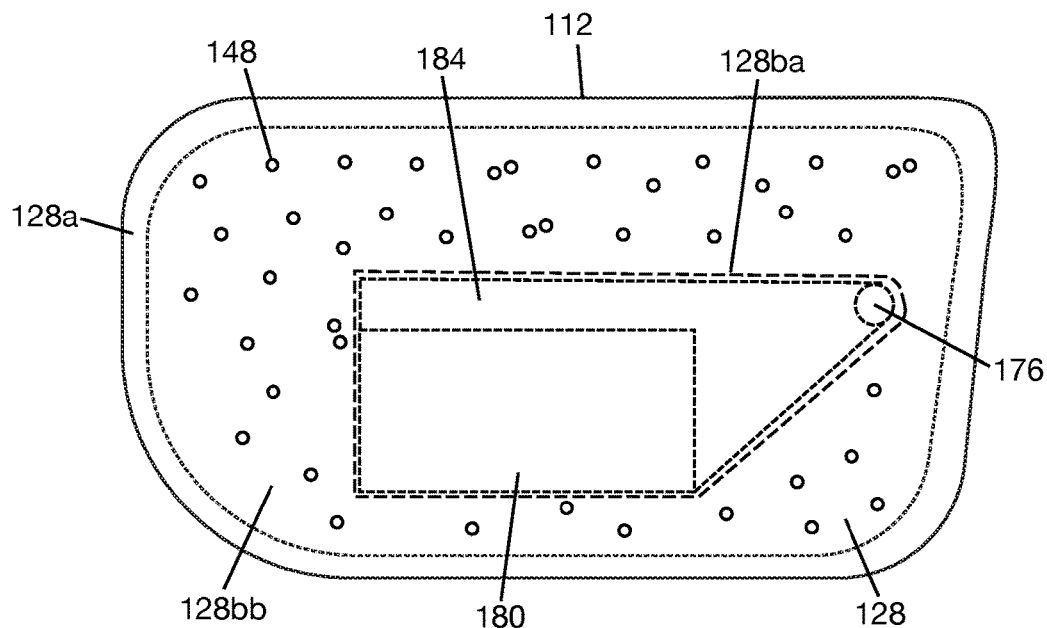
FIG. 2E is a top view of a lightguide showing microbeads excluded from a select area of a top surface of the lightguide, where the lightguide does not have an extension tab.
Figure 2F:
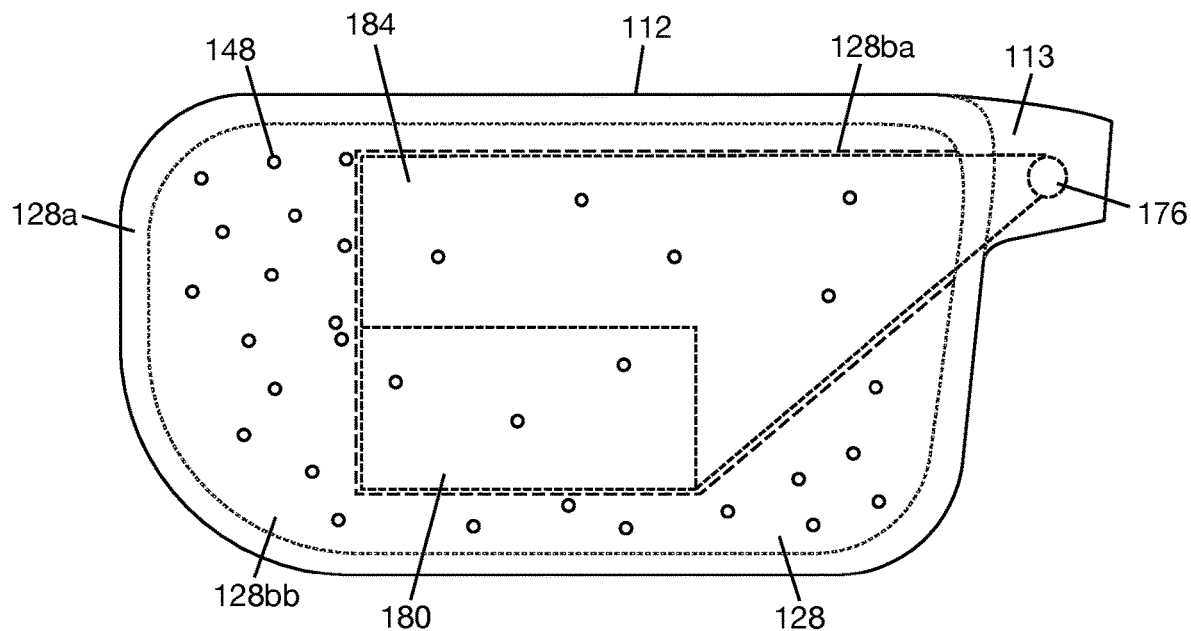
FIG. 2F is a top view of a lightguide showing microbeads with different concentrations on select regions of a top surface of the lightguide.

FIGS. 2C-2F show various examples of positioning or distributing microbeads 148 on top lightguide surface 128 of lightguide 112. Top lightguide surface 128 may have a seal area 128a generally proximate a periphery of lightguide 112 to make contact with a seal (see seal 160 in FIGS. 1A-1D and seal portion 164a in FIG. 1I). In general, microbeads 148 will be excluded from seal area 128a. Top lightguide surface 128 has a medium gap area 128b that is exposed to medium gap 144 (in FIGS. 1A-1D and 1G-1I) or medium gap 144' (in FIG. 1E). Typically, seal area 128a if present will be in a closed loop form circumscribing medium gap area 128b. In FIG. 2C, microbeads 148 are scattered across medium gap area 128b—this generally means that there are no defined regional concentrations of microbeads 148 on top lightguide 128. In FIGS. 2D, 2E, 2F, microbeads 148 are regionally concentrated across medium gap 128b—this means that different areas with distinct concentrations of microbeads 148 can be identified.

In FIGS. 2D, 2E, and 2F, medium gap area 128b of top lightguide surface 128 has a first regional area 128ba with a first microbead concentration and a second regional area 128bb with a second microbead concentration, where the first microbead concentration is lower than the second microbead concentration. In FIGS. 2D and 2E, the first microbead concentration is zero. In FIG. 2F, the first microbead concentration is not zero but is lower than the second microbead concentration. In the illustrated examples of FIGS. 2D and 2F (corresponding to a case where the input zone 176 is on extension tab 113 of lightguide 112), first regional area 128ba with first microbead concentration overlaps output zone 180 (in FIG. 2A) and propagation zone 184 (in FIG. 2A). In the illustrated example of FIG. 2E (corresponding to a case where the input zone is not in an extension tab of lightguide 112), first regional area 128ba overlaps input zone 176 (in FIG. 2B), output zone 180 (in FIG. 2B), and propagation zone 184 (in FIG. 2B). In general, first regional area 128bb may overlap any or all of input zone 176, output zone 180, and propagation zone 184. In general, second regional area 128bb with second microbead concentration will be an area outside of first regional area 128ba with first microbead concentration. The low to no concentration of microbeads 148 in first regional area 128ba may be used to minimize any detrimental effects of microbeads 148 on lightguide performance as light travels from input zone 176 to output zone 180 through propagation zone 184.

To achieve selective positioning of microbeads 148 on top lightguide surface 128 (as shown in FIGS. 2D, 2E, and 2F), the area(s) of top lightguide surface 128 from which microbeads 148 are to be excluded or applied in a low concentration may be masked before applying the microbeads 148 to the top lightguide surface 128. Any microbeads 148 falling on the mask may be removed with the mask afterwards. Alternatively, microbeads 148 may be scattered across the entire top lightguide surface 128, followed by selective removal of the microbeads 148 from the areas of top lightguide surface 128 where microbeads 148 are to be excluded or reduced to a lower concentration.

One method of disposing microbeads in medium gap 144 (in FIGS. 1A-1D, 1G, and 1I) may include mixing microbeads into a liquid carrier, e.g., deionized water or alcohol or gel, agitating the mixture of microbeads and liquid carrier, e.g., by ultrasonic vibration and the like, such that the microbeads are uniformly distributed throughout the mixture, coating the top lightguide surface 128 (or the inner lens surface 124) with the mixture, and allowing the liquid carrier to evaporate, where the microbeads remain on the top lightguide surface 128 (or the inner lens surface 124) after the evaporation of the liquid carrier. Coating may be by clip coating, spin coating, spray coating, and the like. The microbeads are expected to cling to the coated lightguide surface 128 (or inner lens surface 124) by electrostatic force. The method further includes bringing lens 108 and lightguide 112 together to trap the microbeads between inner lens surface 124 and top lightguide surface 128. A slight pressure may be applied to the lens 108 and/or lightguide 112 to slightly compress the microbeads between the surfaces 124, 128. If seal 160 is to be formed between lens 108 and lightguide 112, sealant material may be applied to either of surfaces 124, 128 prior to bringing the lens 108 and lightguide 112 together. Alternatively, sealant material may be injected between lens 108 and lightguide 112 and/or applied around the side edges of lens 108 and lightguide 112 after the microbeads are trapped between inner lens surface 124 and top lightguide surface 128.

If microbeads 148 are to be excluded from certain areas of top lightguide surface 128 (or applied in a lower concentration compared to other areas of top lightguide surface 128), a mask may be applied to top lightguide surface 128 prior to coating top lightguide surface 128 with the mixture of microbeads and liquid carrier. After coating top lightguide surface 128 with the mixture and prior to bringing the lens 108 and lightguide 112 together to trap the microbeads between inner lens surface 124 and top lightguide surface 128, the mask may be removed along with any microbeads that may have fallen on the mask. Alternatively, after coating top lightguide surface 128 with the mixture, microbeads may be removed from select areas of top lightguide surface 128 prior to bringing lens 108 and lightguide 112 together to trap the microbeads between inner lens surface 124 and top lightguide surface 128. If the mixture is applied to inner lens surface 124 instead, the mask may be used on the inner lens surface 124 to form the desired microbead distribution pattern on inner lens surface 124, or microbeads may be selectively removed from inner lens surface 124 to form the desired microbead distribution pattern on inner lens surface 124. When lens 108 and lightguide 112 are brought together, the microbead distribution pattern on inner lens surface 124 will be transferred to top lightguide surface 128.

Any of the methods described above for disposing microbeads in medium gap 144 may be equally applied to disposing microbeads in medium gap 144' (in FIGS. 1E and 1H).

Figure 3A:
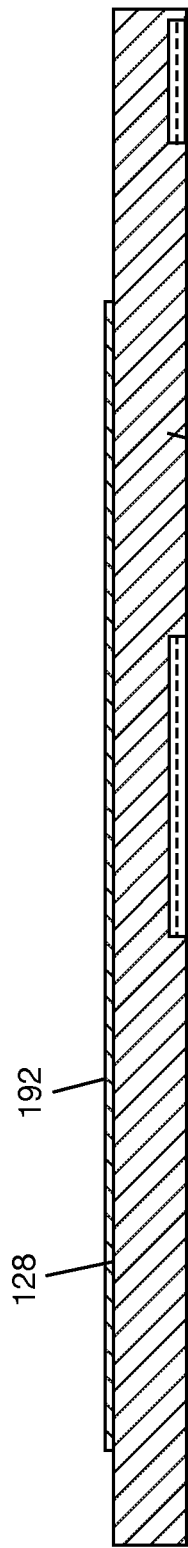
FIG. 3A is a cross-sectional view showing an adhesive layer formed on a top surface of a lightguide.
Figure 3B:
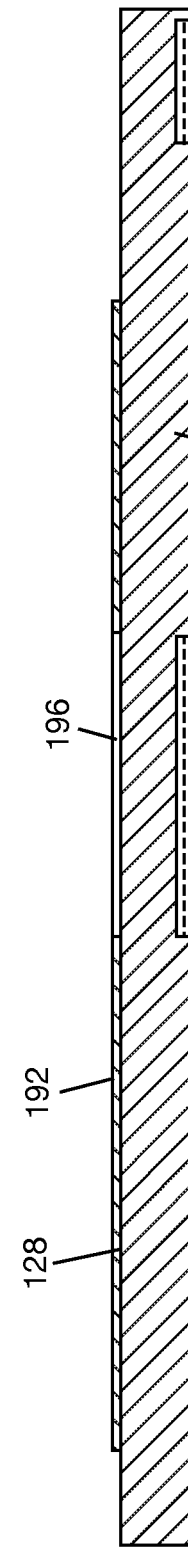
FIG. 3B is a cross-sectional view showing an adhesive layer with a hole formed on a top surface of a lightguide.
Figure 3C:
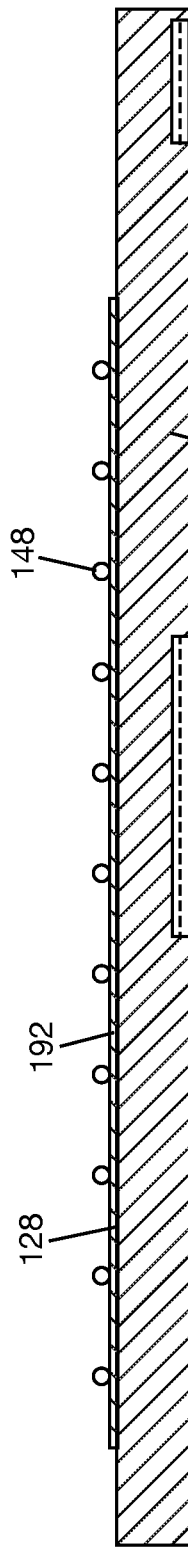
FIG. 3C is a cross-sectional view showing microbeads deposited on the adhesive layer of FIG. 3A.

To prevent microbeads 148 from rolling around inside medium gap 144, e.g., if electrostatic force is not sufficient to keep the microbeads 148 in place, microbeads 148 may be physically retained on at least one of inner lens surface 124 and top lightguide surface 128. In one example, microbeads 148 may be retained in place by an adhesive layer on top lightguide surface 128 or inner lens surface 124. Referring to FIG. 3A, an adhesive material is applied to top lightguide surface 128 to form an adhesive layer 192 on top lightguide surface 128. The adhesive material may be, for example, a curable resin. The adhesive material may be applied by clip coating, spin coating, spray coating, brushing, or the like. If microbeads are to be excluded from some areas of top lightguide surface 128, the adhesive material may be applied only to areas of top lightguide surface 128 where microbeads will be positioned, i.e., the adhesive layer may have holes corresponding to portions of top lightguide surface 128 where microbeads are to be excluded (as an example, see hole 196 in adhesive layer 192 in FIG. 3B). A mixture of liquid carrier and microbeads is prepared as described above. The mixture of microbeads and liquid carrier is then applied on top of the adhesive layer 192, followed by allowing the liquid carrier to evaporate. FIG. 3C shows microbeads 148 on adhesive layer 192. The adhesive material in adhesive layer 192 will secure the microbeads 148 to top lightguide surface 128. If the adhesive material is a curable resin, the adhesive layer is exposed to ultraviolet light (or other suitable heat source based on the nature of the curable resin) for curing. Preferably, adhesive layer 192 is optically transparent, i.e., transparent to at least some wavelengths of electromagnetic energy, e.g., wavelengths corresponding to visible light. In one example, adhesive layer 192 may be index matched to lightguide 112 or have an index of refraction that is less than that of lightguide 112. As shown in FIG. 3D, seal 160 may be applied to top lightguide surface 128, e.g., outside of the portion of top lightguide surface 128 carrying microbeads 148. Then, lens 108 can be brought into contact with microbeads 148 and seal 160 to trap microbeads 148 between inner lens surface 124 and top lightguide surface 128.

In another example, as shown in FIG. 3E, adhesive layer 192 is applied on inner lens surface 124 in the same manner described above, and microbeads 148 are deposited on top lightguide surface 128 in the same manner described above. The lens 108 with adhesive layer 192 is brought into contact with microbeads 148 on top lightguide surface 128 to trap microbeads 148 between inner lens surface 124 and top lightguide surface 128. As in the previous example, microbeads 148 will be held in place by adhesive layer 192 on lens 108. As in the previous example, adhesive layer 192 is preferably optically transparent at least in the visible wavelength range. For the example of FIG. 3E, the refractive index of adhesive layer 192 does not need to be index matched to either of lightguide 112 and lens 108. If microbeads 148 are to be excluded from an area (or areas) of top lightguide surface 128, the desired microbead distribution pattern can be established using any of the previously described methods before bringing lens 108 with adhesive layer 192 into contact with microbeads 148 on top lightguide surface 128.

Figure 3F:
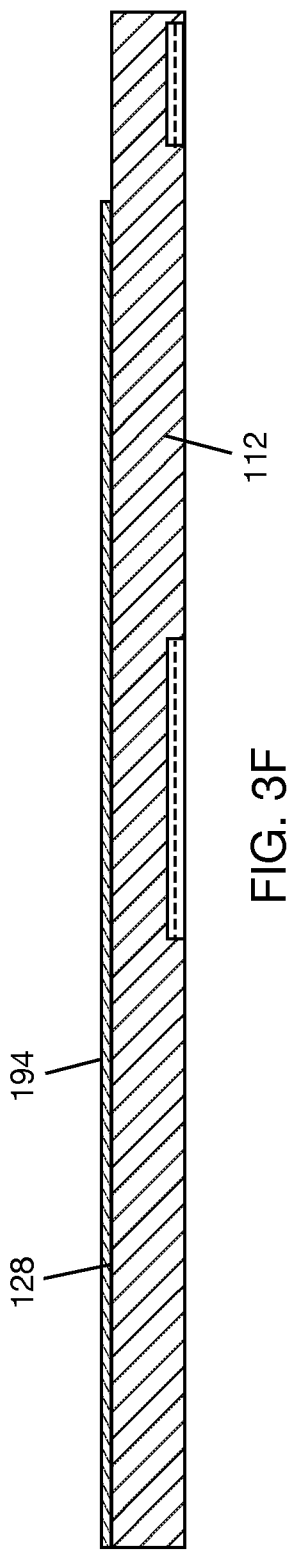
FIG. 3F is a cross-sectional view showing a deformable layer formed on a top surface of a lightguide.
Figure 3G:
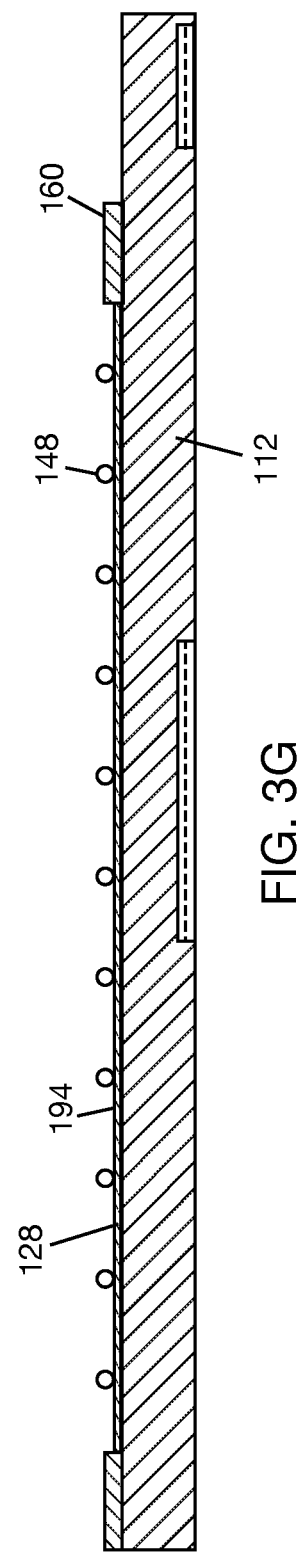
FIG. 3G is a cross-sectional view showing microbeads deposited on the deformable layer of FIG. 3F.
Figure 3H:
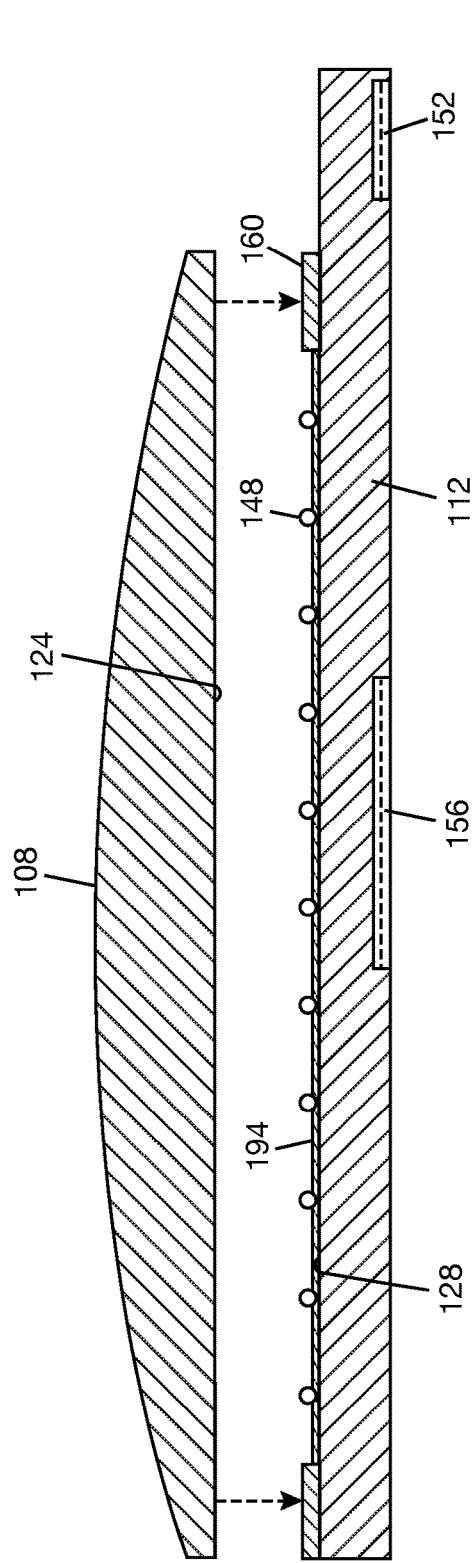
FIG. 3H is a cross-sectional view showing a lens advancing towards the microbeads on the deformable layer of FIG. 3G.

In another example, microbeads 148 may be retained in place by a deformable material applied to top lightguide surface 128 or inner lens surface 124. Referring to FIG. 3F, a deformable material is applied to top lightguide surface 128 to form a deformable layer 194 on top lightguide surface 128. The deformable material may be, for example, a soft polymer that is transparent to wavelengths in the visible range. The deformable material may adhere to the top lightguide surface 128 by an optically transparent adhesive or may cling to top lightguide surface 128 by electrostatic force. In one example, deformable layer 194 may be index matched to lightguide 112 or have an index of refraction that is less than that of lightguide 112. A mixture of microbeads and liquid carrier is prepared as described above. The mixture of liquid carrier and microbeads is then applied on top of deformable layer 194, followed by allowing the liquid carrier to evaporate. If microbeads are to be excluded from certain areas of top lightguide surface 128, the deformable layer 194 may double up as a mask. For example, there may be a portion of deformable layer 194 that is separable from the bulk of deformable layer 194 after applying the mixture on top of deformable layer 194. Alternatively, a mask may be applied on top of deformable layer 194 prior to applying the mixture on top of the deformable layer 194. Alternatively, the microbeads could be selectively removed from the deformable layer 194 to achieve the desired microbead distribution pattern on top lightguide surface 128. FIG. 3G shows microbeads 148 on deformable layer 194. In one example, seal 160 may be applied on top lightguide surface 128, e.g., outside of the portion of top lightguide surface 128 carrying deformable layer 194 and microbeads 148. When lens 108 and lightguide 112 are brought together to trap the microbeads between the inner lens 124 and top lightguide surface 124, as shown in FIG. 3H, a slight pressure is applied to lens 108 and/or lightguide 112, which will slightly press the microbeads 148 into deformable layer 194. The deformable layer 194 will deform around the microbeads 148 and thereby hold the microbeads 148 in place.

Any of the methods described above for retaining microbeads 148 in place in medium gap 144 (in FIGS. 1A-1D, 1G, and 1I) may be equally applied to retaining microbeads 148 in place in medium gap 144' (in FIGS. 1E and 1H).

Figure 4A:
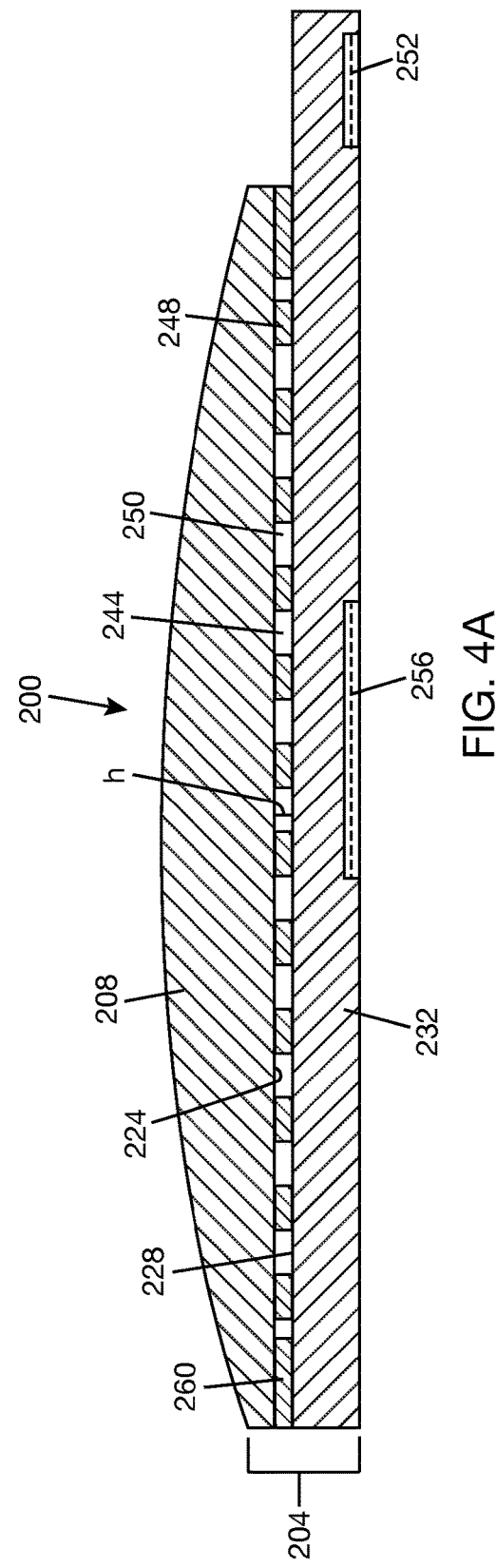
FIG. 4A is a cross-sectional view of an optical combiner lens including a lens, a lightguide, and micropillar spacers in a medium gap between the lens and the lightguide.

FIG. 4A shows an optical combiner lens 200 including lens 208 and lightguide 212 arranged in a stack 204. Medium gap 244 is defined within stack 204 and between inner lens surface 224 and top lightguide surface 228. Spacers 248 are disposed between inner lens surface 224 and top lightguide surface 228 to maintain medium gap 244. In FIG. 4A, spacers 248 are micropillars. Lens 208 has the same properties as described above for lens 108, and lightguide 212 has the same properties as described above for lightguide 112. Input coupler 252 may be positioned to couple light into lightguide 212 as described for input coupler 152 and lightguide 112. Output coupler 256 may be positioned to couple light out of lightguide 212 as described above for output coupler 156 and lightguide 112. Lens 208 and lightguide 212 may be held together by seal 260 (or other seal structures previously described), as described for lightguide 112 and seal 160 (or other seal structures). Optical combiner lens 200 thus differs from optical combiner lens 100 described above (FIGS. 1A-1D, 1G, and 1I) in that spacers 248 are micropillars instead of microbeads.

Spaces 250 between micropillars 248 contain a medium as described above for space 150 between microbeads 148 (in FIGS. 1A-1D, 1G, and 1I). In one implementation, each micropillar 248 may extend between and contact both of inner lens surface 224 and top lightguide surface 228. In another implementation, at least some of the micropillars 248 may extend between and contact both of inner lens surface 224 and top lightguide surface 228. Micropillars 248 may be made of the same material as described above for spacers 148. Micropillars 248 may be selected to maintain medium gap 244 at or above the threshold height to minimize evanescent coupling, as described above for spacers 148. Micropillars 248 may have the same example height ranges described above for spacers 148. For example, each micropillar 248 may have a height in a range from 2 to 100 microns, or in a range from 2 microns to 50 microns, or in a range from 2 microns to 10 microns, or in a range from 2 microns to 6 microns, or in a range from 2 microns to 4 microns. In some examples, an aspect ratio (width to height ratio) of each micropillar 248 may be in a range from 0.5 to 1.5. In general, the width of each micropillar 248 need only be sufficient to provide a suitable mechanical support of medium gap 144.

The refractive index of each micropillar spacer 248 may be $n_1$ (refractive index of lens 208) or $n_2$ (refractive index of lightguide 212) or may be different from $n_1$ and $n_2$, as described above for spacer 148. The concentration of micropillars 248 on top lightguide surface 228 may be selected to minimize perception of light scattering at lens 208. In general, the lower the concentration of micropillars 248, the lower the perception of light scattering will be. In one example, the concentration of micropillars spacers 248 on top lightguide surface 228, i.e., the number of micropillars 248 divided by the surface area of top lightguide surface exposed to medium gap 244, may be in a range from 1 to 50 micropillars per $mm^2$, or in a range from 1 to 25 per $mm^2$, or in a range from 1 to 8 micropillars per $mm^2$, or in a range from 1 to 6 micropillars per $mm^2$, or in a range from 1 to 4 micropillars per $mm^2$. However, this concentration can generally be selected based on what would minimize perception of light scattering at lens 208. Micropillars 248 may be selectively excluded from areas of the top lightguide surface 228 as described above for the microbeads or applied in regional concentrations on top lightguide surface 228 as described above for the microbeads.

Figure 4B:
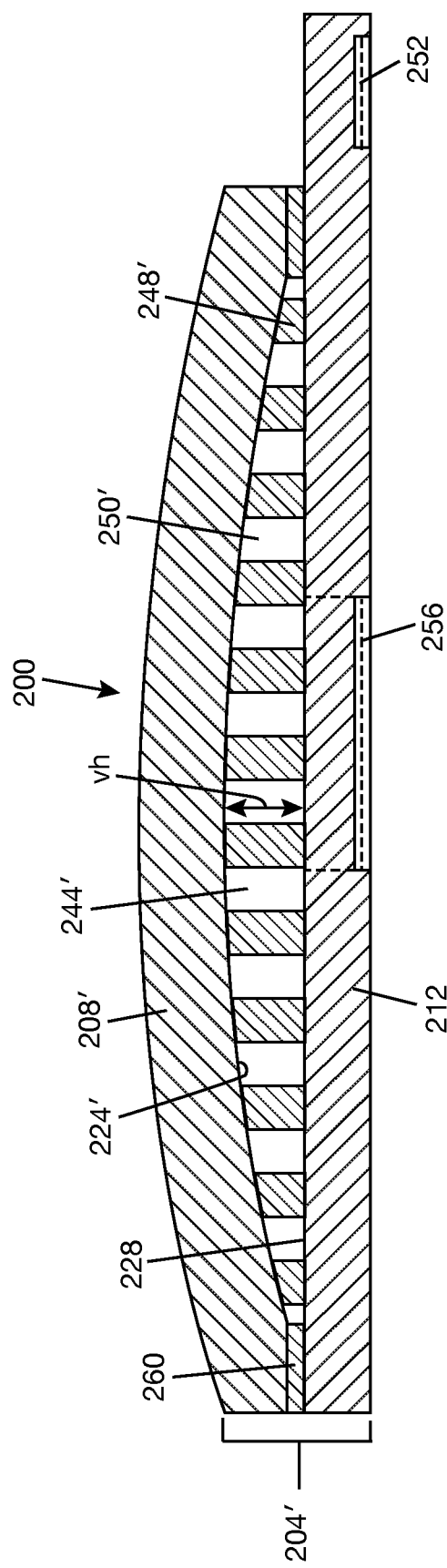
FIG. 4B is a cross-sectional view of an optical combiner lens including a meniscus lens, a lightguide, and micropillars of different heights in a medium gap between the meniscus lens and the lightguide.

In the example shown in FIG. 4A, lens 208 is a planoconvex lens, lightguide 212 is a planar lightguide, and inner lens surface 224 is generally parallel to the top lightguide surface 228 so that medium gap 244 generally has a uniform height h across the stack. In this case, micropillars 248 with height h will maintain medium gap 244 at height h across stack 204. In FIG. 4B, lens 208' is a meniscus lens, and micropillars 248' are disposed in medium gap 244' between inner lens surface 224' that is curved and top lightguide surface 228 that is planar. Medium gap 244' has a variable height vh across stack 204' due to inner lens surface 224' being curved and/or not being parallel to top lightguide surface 228. In the illustrated example of FIG. 4B, micropillars 248' have different heights to accommodate the variation in height of medium gap 244'. Each micropillar 248' may extend between and contact both inner lens surface 224' and top lightguide surface 228. Further, the surfaces of micropillars 248' in contact with inner lens surface 224' may be curved to conform with inner lens surface 224'. The variable height vh of medium gap 244' may be within the described ranges for the height h of medium gap 244 in FIG. 4A. Spaces 250' between and around micropillars 248' may contain a medium, such as described above for spaces 250 or spaces 150.

Figure 5A:
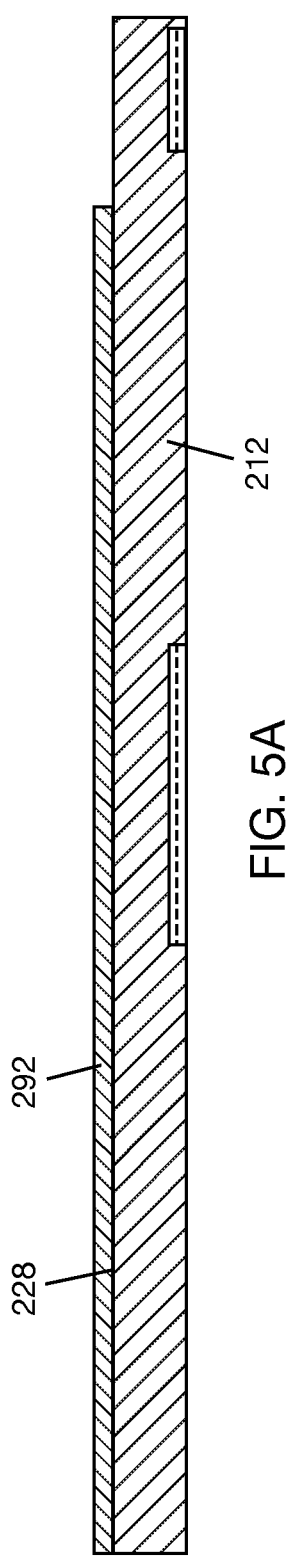
FIG. 5A is a cross-sectional view showing a resist layer formed on a lightguide.
Figure 5D:
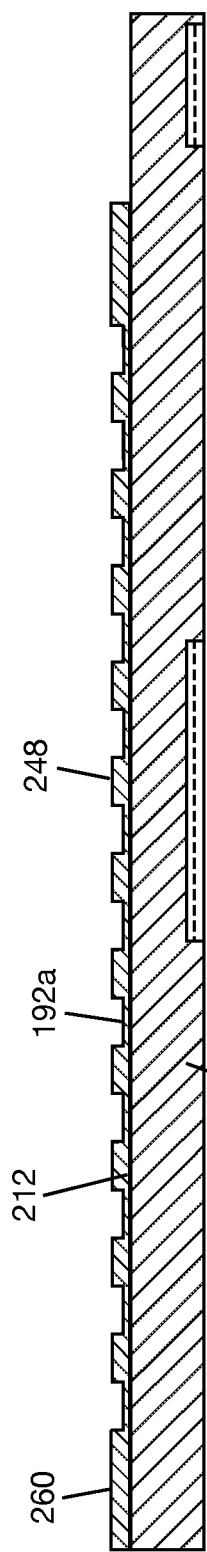
FIG. 5D is a cross-sectional view showing micropillars formed in the resist layer on the lightguide of FIG. 5A.
Figure 5E:
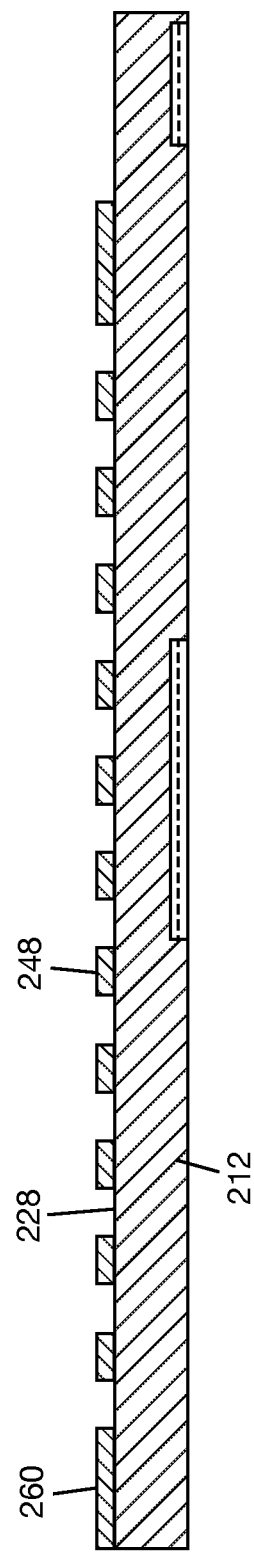
FIG. 5E is a cross-sectional view showing micropillars on the lightguide of FIG. 5A without residual material between the micropillars.

One method of disposing micropillars 248 in medium gap 244 may include forming micropillars 248 on top lightguide surface 228 by, for example, nanoimprint lithography. In one example, this may include making a mold with the micropillar topological pattern, i.e., a desired arrangement of the micropillars in the medium gap. In FIG. 5A, a resist layer 292, e.g., a polymer, is formed on top lightguide surface 228. The resist layer may be formed by a suitable coating process, such as spin coating and the like. In FIG. 5B, a mold 194 with the micropillar topological pattern is brought into contact with resist layer 292 and pressed against resist layer 292. The assembly (mold, resist layer, and lightguide) is heated to a temperature above a glass-transition temperature of resist layer 292, which would allow mold 194 to deform resist layer 292 and transfer the micropillar pattern to resist layer 292, as shown in FIG. 5C. The deformed resist layer 292 is cooled to below its glass transition temperature, and mold 194 is removed from the deformed resist layer. Micropillars 248 are now formed on lightguide 212, as shown in FIG. 5D. There will be residual material 192a in between the micropillars. Residual material 192a may be left between micropillars 248, as shown in FIG. 5D, or may be removed from between micropillars 248, e.g., by etching, as shown in FIG. 5E. Seal 260 may be formed in resist layer 292 at the same time that micropillars 248 are formed in resist layer 292, as shown in FIGS. 5B to 5E. After separating mold 194 from resist layer 292, seal 260 may be heated to a temperature above a glass transition temperature of the seal material/resist layer material, followed by bringing lens 208 in contact with seal 260 and micropillars 248, as shown in FIG. 5F. This will result in seal pad 260 engaging lens 208 and lightguide 212, with the micropillars 248 trapped between inner lens surface 224 and top lightguide surface 228. Alternatively, or in addition to seal 260, a seal that wraps around lens 208 and the portion of lightguide 212 in registration with lens 208 may be formed. For example, after bringing lens 208 in contact with micropillars 248 on lightguide 212, as shown in FIG. 5G, seal 260' may be applied along the edge surfaces of lens 208 and the portion of lightguide 212 in registration with lens 208.

The method described above may be used to dispose micropillars 248' (in FIG. 4B) in medium gap 244' (in FIG. 4B) with a mold having a suitable micropillar topological pattern.

Figure 6A:
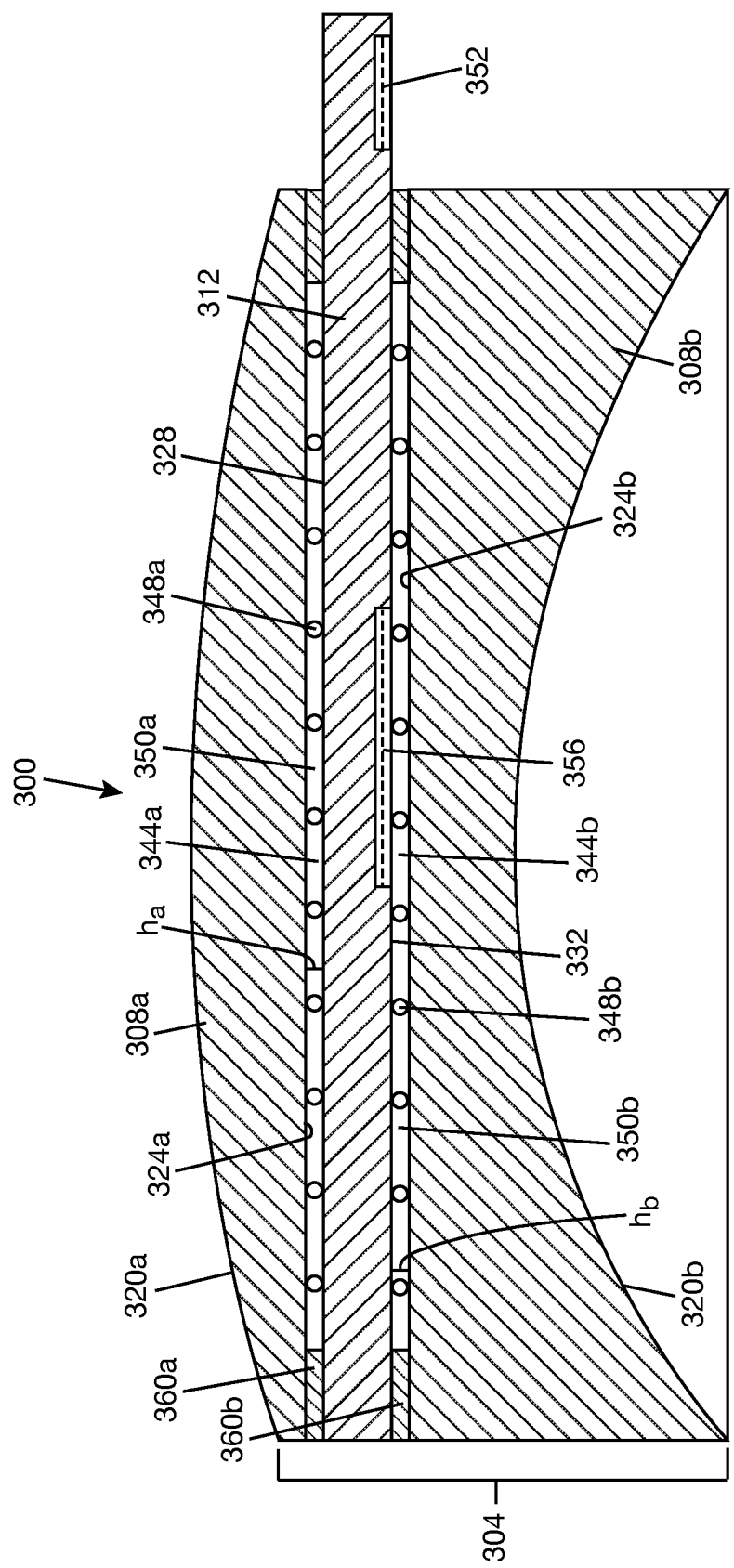
FIG. 6A is a cross-sectional view of a double lens optical combiner lens including a first lens, a lightguide, a second lens, a first set of microbeads in a medium gap between the first lens and the lightguide, and a second set of microbeads in a medium gap between the lightguide and the second lens.

FIG. 6A shows a double lens optical combiner lens 300 including first lens 308a, lightguide 312, and second lens 308b arranged in a stack 304, with lightguide 312 disposed between first lens 308a and second lens 308b. Medium gap 344a is defined within stack 304 and between inner lens surface 324a and top lightguide surface 328. Medium gap 344b is defined within stack 304 and between inner lens surface 324b and top lightguide 328. Spacers 348a are disposed between inner lens surface 324a and top lightguide surface 328 to maintain medium gap 344a. Spacers 348b are disposed between inner lens surface 324b and bottom lightguide surface 332 to maintain medium gap 344b. Lens 308a has the same properties as described above for lens 108, and lightguide 312 has the same properties as described above for lightguide 112. In the illustrated example of FIG. 6A, first lens 308a is a planoconvex lens, where inner lens surface 324a is planar and outer lens surface 320a is convex. Second lens 308b is a planoconcave lens, where inner lens surface 324b is planar and outer lens surface 320a is concave. Input coupler 352 may be positioned to couple light into lightguide 312 as described for input coupler 152 and lightguide 112. Output coupler 256 may be positioned to couple light out of lightguide 312 as described above for output coupler 156 and lightguide 112. Lens 308a, lightguide 312, and lens 308b may be held together by seals 360a, 360b. Optical combiner lens 300 thus differs from optical combiner lens 100 described above (FIGS. 1A-1D, 1G, and 1I) in that optical combiner lens 300 has two lenses 308a, 308b, two medium gaps 344a, 344b, and spacers 348a, 348b disposed in the two medium gaps 344a, 344b. Outer lens surface 320a of first lens 308a may be the world side of optical combiner lens 300, and outer lens surface 320b of second lens 308b may be the eye side of optical combiner lens 300. Curvatures of lens surfaces 320a, 3206 may be selected to achieve a desired eyeglasses prescription.

Inner lens surface 324a of second lens 308a is in opposing relation to top lightguide surface 328, and medium gap 344a of height $h_a$ is formed between inner lens surface 324a and top lightguide surface 328. Medium gap 344a is maintained by spacers 348a arranged between inner lens surface 324a and top lightguide surface 328. Similarly, inner lens surface 324b of second lens 308b is in opposing relation to bottom lightguide surface 332, and medium gap 344b of height $h_b$ is formed between inner lens surface 324b and bottom lightguide surface 332. Medium gap 344b is maintained by spacers 348b arranged between inner lens surface 324b and bottom lightguide surface 332. In the illustrated example of FIG. 6A, spacers 348a, 348b are microbeads. Spaces 350a between microbeads 348a contain a medium, and spaces 350b between microbeads 348b containing a medium, as described above for space 150 between microbeads 148 (in FIGS. 1A-1D, 1G, and 1I). Medium gaps 344a, 344b may be hermetically sealed, e.g., by seal 360a, 360b or any other sealing structure that circumscribes medium gaps 344a, 344b. Microbeads 348a, 348b may be made of the same material as described above for microbeads 148. Microbeads 348a may be selected to maintain medium gap 344a at or above the threshold height to minimize evanescent coupling between lightguide 312 and first lens 308a, as previously described. Microbeads 348b may be selected to maintain medium gap 344b at or above the threshold height to minimize evanescent coupling between lightguide 312 and second lens 308b, as previously described. As an example, each microbead 348a, 348b may have a height in a range from 2 to 100 microns, or in a range from 2 microns to 50 microns, or in a range from 2 microns to 10 microns, or in a range from 2 microns to 6 microns, or in a range from 2 microns to 4 microns.

Spacers 348a, 348b maintain medium gaps 344a, 344b, respectively, at a nonzero height $h_a$, $h_b$, respectively. In general, spacers 344a, 344b may satisfy the same requirements as described above for spacers 148, with reference to FIGS. 1A-1D, 1G, and 1I, in terms of material, height (or diameter), refractive index, and concentration (the concentration of spacers 344a will be relative to top lightguide surface 348a, while the concentration of spacers 344b will be relative to bottom lightguide surface 332). Any of the methods described above for retaining spacers 148 on inner lens surface 124 and/or top lightguide surface 128 may be used to retain spacers 348a on inner lens surface 324a and/or top lightguide surface 328 and spacers 348b on inner lens surface 324b and/or bottom lightguide surface 332. Further, spacers 348a may be scattered across respective top lightguide surface 328 or regionally concentrated on respective lightguide surface 328, as previously described with reference to FIGS. 2C-2F. Similarly, spacers 348b may be scattered across bottom lightguide surface 332 or regionally concentrated on bottom lightguide surface 332, in the same manner described for spacers 148 and top lightguide surface 128 in FIGS. 2C-2F. For the double lens optical combiner lens 300, light enters lightguide 312 through input coupler 352 (or input edge of lightguide 312 if edge coupling is used), travels along lightguide 312 by total internal reflection, and exits lightguide 312 through output coupler 356. Lens 308b receives the light coming out of output coupler 356.

Figure 6B:
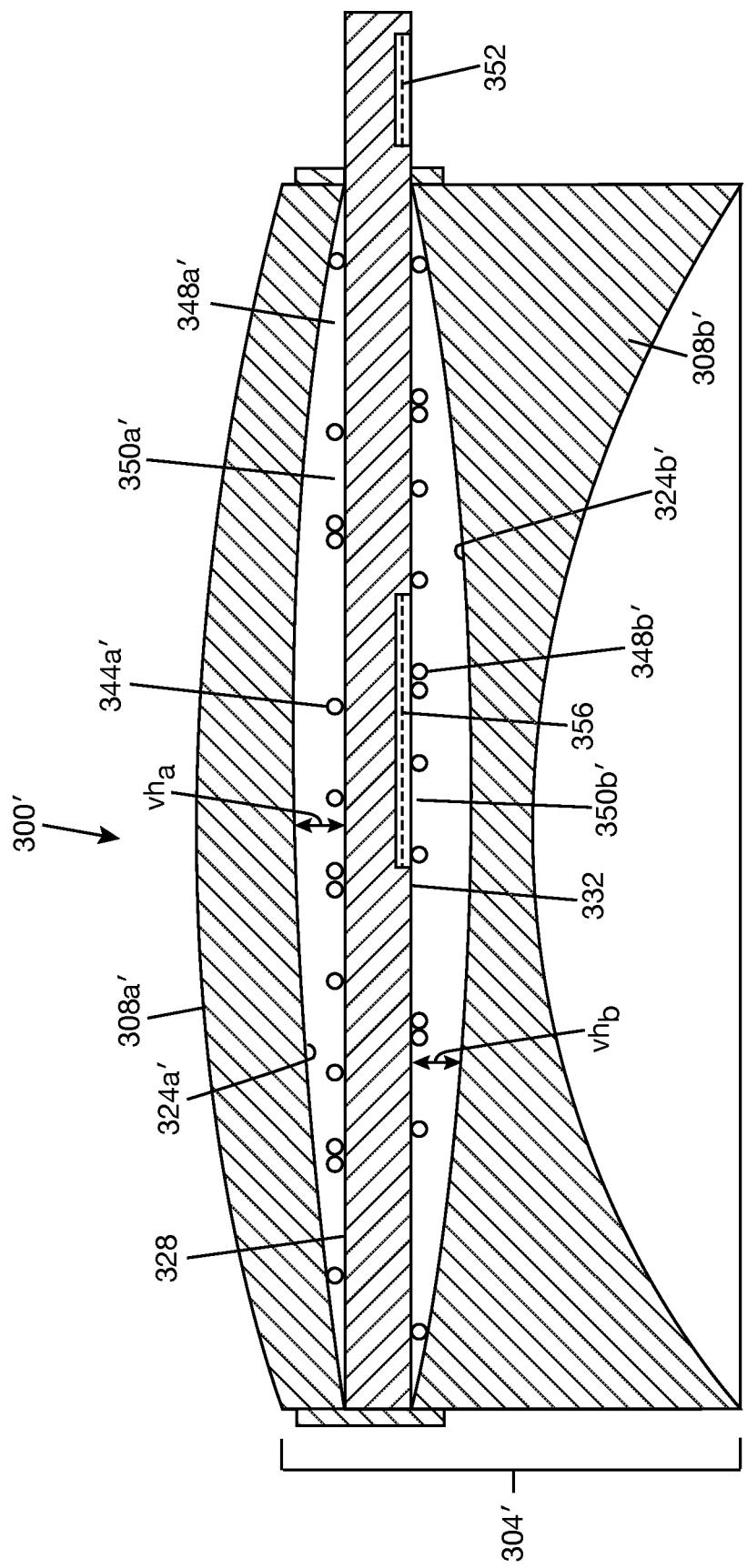
FIG. 6B is a cross-sectional view of a double lens optical combiner lens including a meniscus lens, a lightguide, a biconcave lens, a first set of microbeads in a medium gap between the meniscus lens and the lightguide, and a second set of microbeads in a medium gap between the lightguide and the biconcave lens.

In FIG. 6A, first lens 308a is a planoconvex lens, second lens 308b is a planoconcave lens, and lightguide 312 is a planar lightguide, which results in medium gaps 344a, 344b with generally uniform heights $h_a$, $h_b$, respectively. In FIG. 6B, first lens 308a' is a meniscus lens, second lens 308b' is a biconcave lens, and lightguide 212 is a planar lightguide, which results in medium gaps 344a', 344b' with variable height $vh_a$, $vh_b$, respectively. Medium gap 344a' is formed between inner lens surface 324a' of first lens 308a and top lightguide surface 328, and medium gap 344b' is formed between inner lens surface 324b' of second lens 308b' and bottom lightguide surface 332. Spacers 348a' maintain medium gap 344a', and spacers 348b' maintain medium gap 344b'. Spacers 348a', 348b' are shown as microbeads in FIG. 6B and may have the same characteristics described above for spacers 348a, 348b, respectively. Some of the microbead spacers 348a' are wedged between inner lens surface 324a' and top lightguide surface 328, while others of the microbead spacers 348a' may contact, or may be retained on, only one of the top lightguide surface 328 and inner lens surface 324a. Similarly, some of the microbead spacers 348b' are wedged between inner lens surface 324b' and bottom lightguide surface 332, while others of the microbead spacers 348b' may contact, or may be retained on, only one of the bottom lightguide surface 332 and inner lens surface 324b'.

Figure 6C:
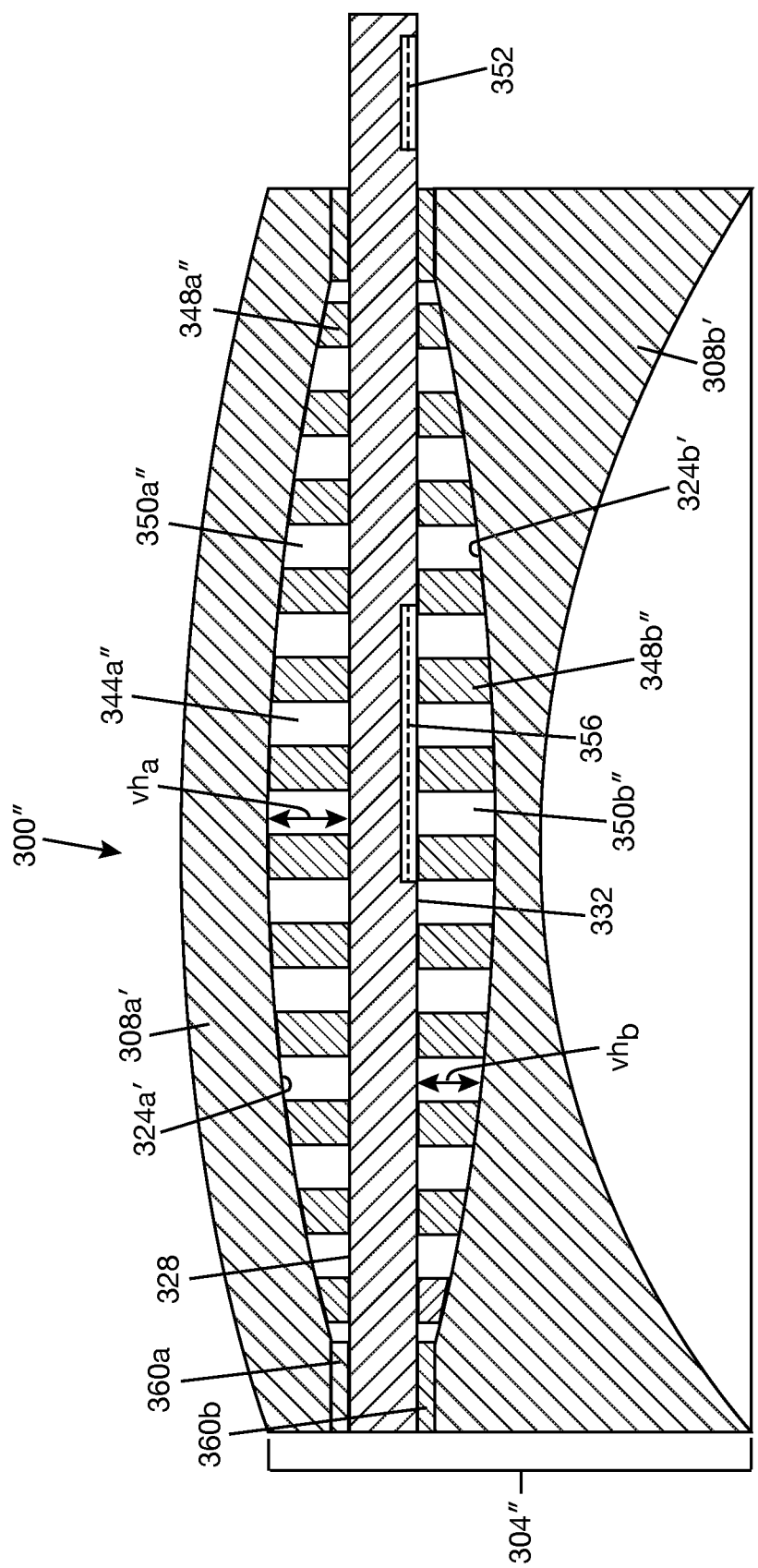
FIG. 6C is a cross-sectional view of a double lens optical combiner lens including a meniscus lens, a lightguide, a biconcave lens, a first set of micropillars in a medium gap between the meniscus lens and the lightguide, and a second set of micropillars in a medium gap between the lightguide and the biconcave lens.

In optical combiner lens 300" of FIG. 6C, spacers 348a" maintain medium gap 344a" and spacers 348b" maintain medium gap 344b". Optical combiner lens 300" of FIG. 6C thus differs from optical combiner lens 300' of FIG. 6B in that spacers 348a", 348b" are micropillars. In FIG. 6C, micropillar spacers 348a" have different heights to maintain medium gap 344a" of height $vh_a$, and each micropillar 348a" may extend between, and contact both of, inner lens surface 324a' and top lightguide surface 328. Similarly, micropillar spacers 348b" have different heights to maintain medium gap 344b" of height $vh_b$, and each micropillar 348b" may extend between, and contact both of, inner lens surface 324b' and bottom lightguide surface 332. Spacers 348a", 348b" may have the same properties described above for spacers 248 in terms of material, height ranges, refractive indices, and concentration relative to respective surfaces of lightguide 312. The heights of spacers 348a", 348b" can be suitably selected to maintain medium gaps 344a", 344b", respectively. Spaces 350a" around and in between spacers 348a" and spaces 350b" around and in between spacers 348b" may contain a medium, such as air and the like, as described for all the other spaces in medium gaps. Medium gaps 344a", 344b" may be hermetically sealed at a periphery of stack 304" by seals 360a, 360b disposed between lenses 308a', 308b' and lightguide 312 or other seal structures that hold lenses 308a', 308b' and lightguide 312 together. Although not shown, a seal structure that wraps around the side edge of lightguide 312 may act as a light dump as previously explained with reference to FIGS. 1G, 1H, and 1I.

Figure 7A:
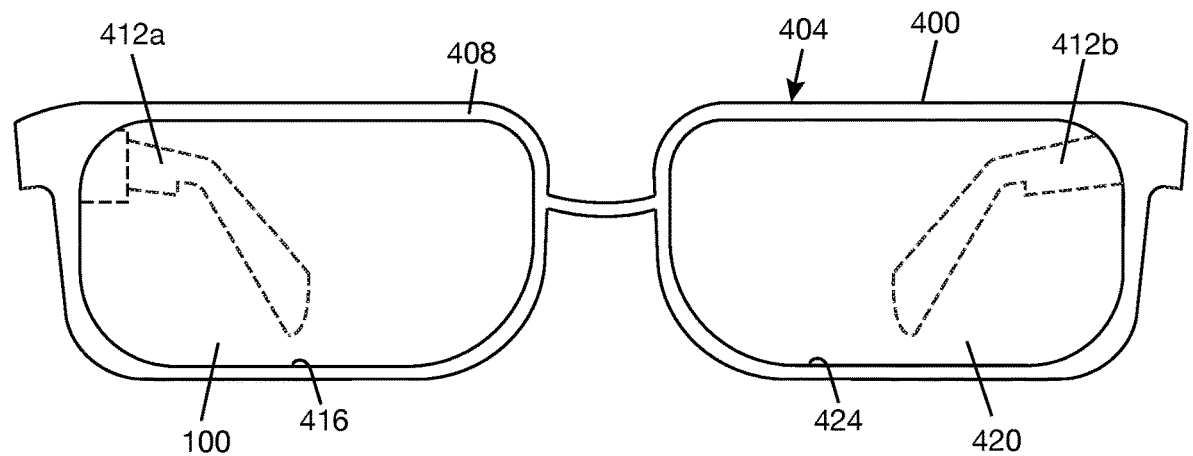
FIG. 7A is a front elevational view showing a wearable heads-up display including an optical combiner lens.

Any of the optical combiner lenses described above may be integrated into a wearable heads-up display. For illustration purposes, FIG. 7A shows optical combiner lens 100 carried by a support structure 400 of a wearable heads-up display 404. Support structure 400 is in the form of an eyewear frame including a front frame 408 and temples 412a, 412b attached to opposite sides of front frame 408. In one example, optical combiner lens 100 is fitted into a lens mount 416 in front frame 408. A second eyeglasses lens 420 is fitted into a lens mount 424 in front frame 408. Lens 420 may or may not be an optical combiner lens.

Figure 7B:
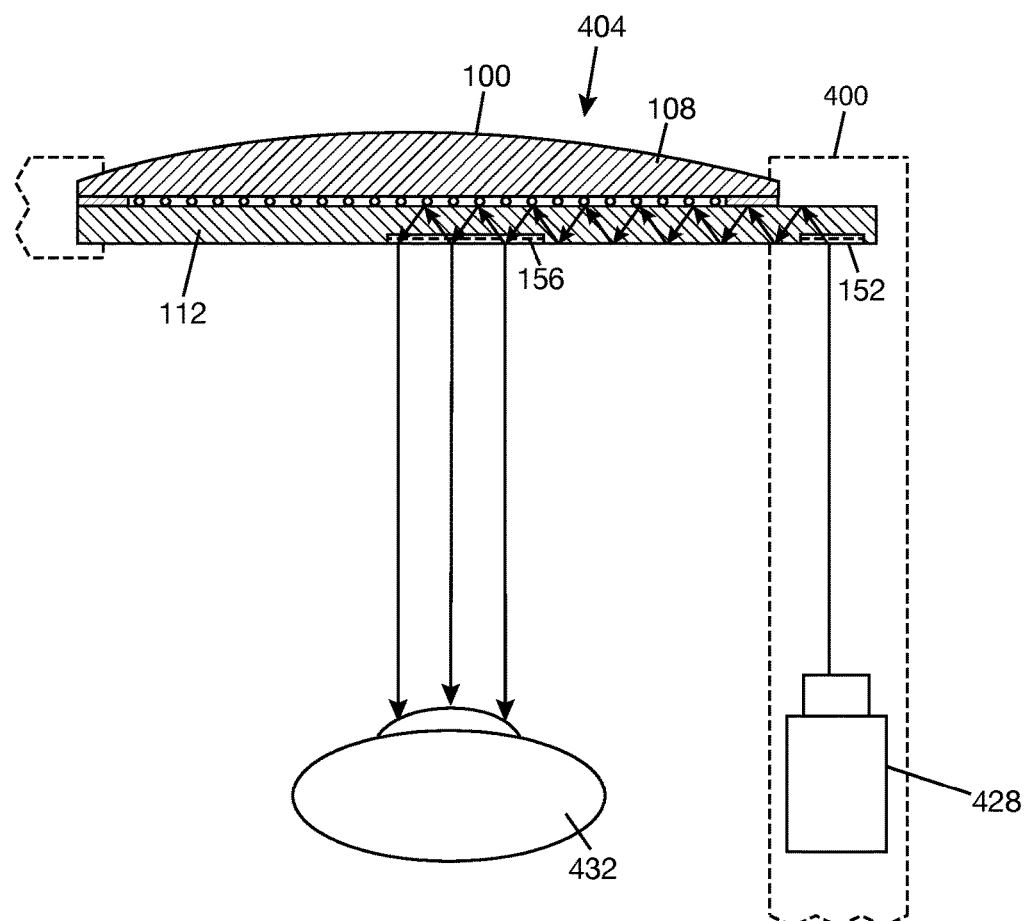
FIG. 7B is a schematic illustrating light coupled into and out of a lightguide of an optical combiner lens.

Referring to FIG. 7B, wearable heads-up display 404 includes a display light source 428, such as a projector, a scanning laser projector, a microdisplay, or the like, which may be carried in temple 412a (in FIG. 7A). Light from display light source 428 enters lightguide 112 through input coupler 152, travels along lightguide 112 by total internal reflection, and exits lightguide 112 through output coupler 156. The light exiting output coupler 156 enters the pupil of an eye 432 of a user wearing the wearable heads-up display. Although FIG. 7B shows optical combiner lens 100 coupling light from display light source 428 to eye 432, it should be understood that any of the optical combiner lenses described above, including single lens and double lens optical combiner lenses, may be used to couple light from display light source 428 to eye 432.

FIG. 8A shows another optical combiner lens 500 that may be used in a wearable heads-up display. Optical combiner lens 500 includes a lightguide assembly 502 and a lens 504. Lightguide assembly 502 is embedded in lens 504. For example, lightguide assembly 502 may be embedded in lens 504 by molding or casting lens 504 around lightguide assembly 502. Lightguide assembly 502 includes a lightguide 512 having a top lightguide surface 528 and a bottom lightguide surface 532—the terms "top" and "bottom" are relative to the orientation of the drawing. Spacers 548a are positioned on, or in contact with, top lightguide surface 528. A protective layer 549a is applied on the layer formed by spacers 548a. Spacers 548a define a first medium gap 544a that is disposed between top lightguide surface 528 and lens 504, or between top lightguide surface 528 and protective layer 549a. Spacers 548b are positioned underneath, or in contact with, bottom lightguide surface 532. A protective layer 549b is applied underneath the layer formed by the spacers 548b. Spacers 548b define a second medium gap 544b that is disposed between bottom lightguide surface 532 and lens 504, or between bottom lightguide surface 532 and protective layer 549b. Protective layers 549a, 549b form a protective enclosure around lightguide 512 and spacers 548a, 548b. In one implementation, protective layers 549a, 549b are thin films of material that are deformable or conformable, which would allow protective layers 549a, 549b to conform to the general shape formed by the lightguide 512 and spacers 548a, 548b. For example, protective layers 549a, 549b may be made of a soft polymer. Protective layers 549a, 549b are preferably made of a material that is transparent to at least wavelengths in the visible range. Thus, for example, protective layers 549a, 549b may be made of a soft polymer that is transparent to wavelengths in the visible range.

Figure 8B:
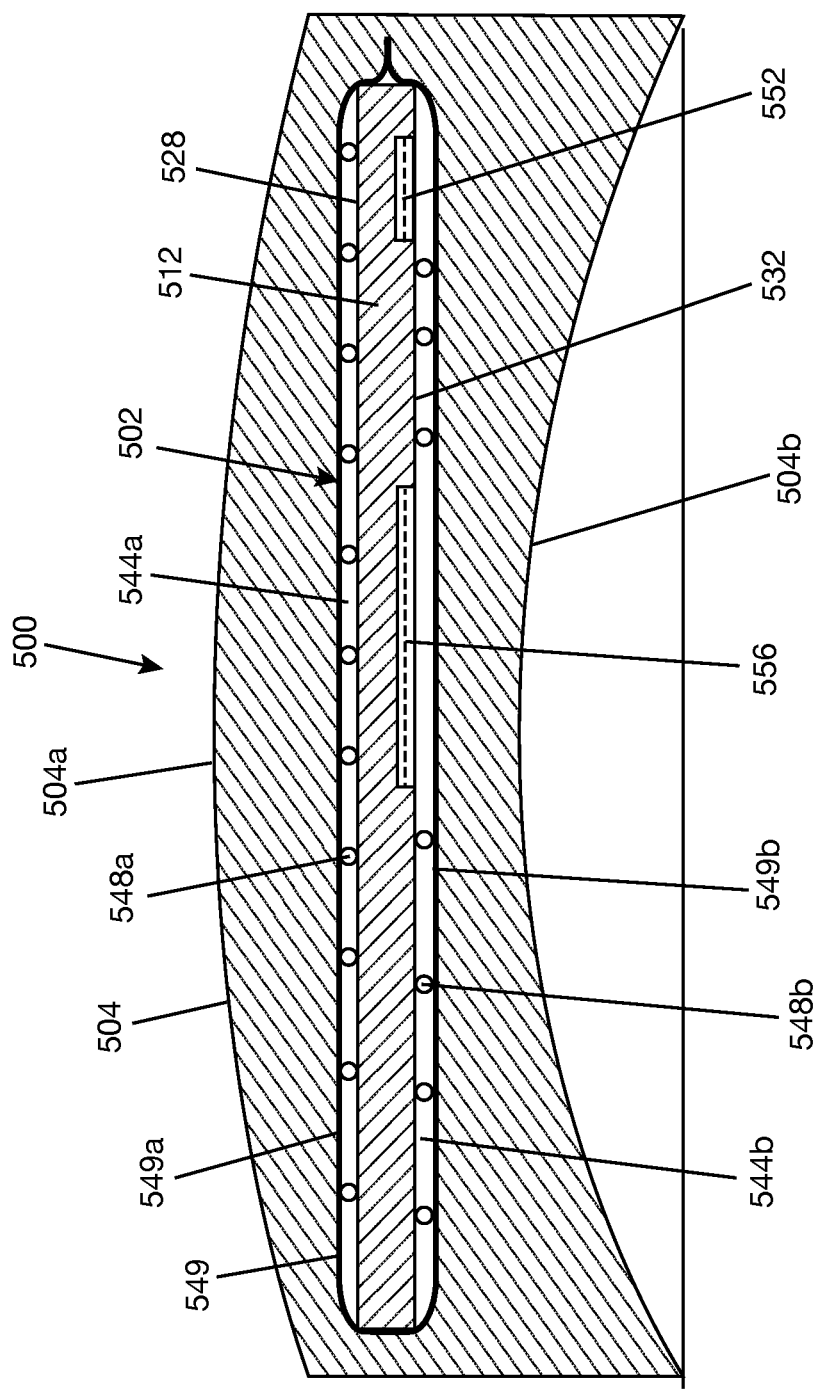
FIG. 8B is a cross-sectional view of a variant of the optical combiner lens of FIG. 8A showing the lightguide and spacers of the lightguide assembly enclosed in a bag and the bag embedded in the lens.

The end portions of protective layers 549a, 549b that extend beyond a periphery of lightguide 512 may be joined or otherwise sealed together to form a hermetic enclosure around lightguide 512, spacers 548a, 548b, and medium gaps 544a, 544b. Alternatively, the end portion of protective layer 549a may be sealed against lightguide surface 528 near a periphery of lightguide 512 to form a hermetic seal around medium gap 544a, and the end portion of protective layer 549b may be sealed against lightguide surface 532 near a periphery of lightguide 512 to form a hermetic seal around medium gap 544b. Alternatively, as shown in FIG. 8B, portions of a protective bag 549 that slips over lightguide 512 and spacers 548a may provide the protective layers 549a, 549b. The open end of the protective bag 549 may be sealed together, or against the lightguide surfaces 528, 532, to form a hermetic enclosure around medium gaps 544a, 544b. A protective sleeve may also be used in lieu of a protective bag to provide the protective layers 549a, 549b, with the ends of the protective sleeve appropriately sealed to provide a sealed enclosure for the medium gaps 544a, 544b.

Portions of protective layers 549a, 549b may squeeze into the spaces between respective spacers 548a, 548b as the protective layers 549a, 549b deform at points of contact with spacers 548a, 548b. The thickness of protective layers 549a, 549b may be selected to be greater than a diameter or width of the respective spacers 548a, 548b so that the protective layers 549a, 549b do not deform and fill the gaps between the spacers. As an example, the protective layers 549a, 549b may have a thickness in a range from 50 microns to 100 microns, with the condition that the spacers 548a, 548b have a diameter or width less than the thickness of the respective protective layers. Preferably, the protective layers 548a, 548b have a refractive index that matches or substantially matches that of lens 504.

Lightguide 512 may have the same properties as described above for lightguide 112. Lightguide 512 may be planar, as shown in FIG. 8A, or may be curved, i.e., not lying flat on a plane. An input coupler 552 may be positioned on or proximate any of lightguide surfaces 528, 532 to couple light into lightguide 512 as described previously for input coupler 152 and lightguide 112. An output coupler 556 may be positioned on or proximate any of lightguide surfaces 528, 532 to couple light out of lightguide 512 as previously described for output coupler 156 and lightguide 112. Lightguide 512 may be made of the same materials as previously described for lightguide 112. In general, lightguide 512 is made of a material that is transparent to at least some electromagnetic wavelengths, e.g., wavelengths in the visible range.

Spacers 548a, 548b may be microbeads, as shown in FIG. 8A, or may be other types of spacers, such as micropillars. Spacers 548a, 548b may have the same properties as described previously for spacers that maintain or set a medium gap, e.g., spacers 148. In order to enable light to propagate along lightguide 512 by total internal reflection, medium gaps 544a, 544b may contain air or other medium having a refractive index that is lower than a refractive index of lightguide 512. The heights of medium gaps 544a, 544b are generally set by respective spacers 548a, 548b and may satisfy the same conditions previously described for medium gap 144.

Lens 504 has lens surfaces 504a, 504b. These surfaces may be curved surfaces, e.g., lens surface 504a may be a convex surface and lens surface 504b may be a concave surface, i.e., lens 504 may be a meniscus lens. Alternatively, lens 504 may be a planoconvex lens, where lens surface 504a is convex and lens surface 504b is planar. In general, the curvature of the lens surfaces 504a, 504b may be selected based on a desired optical power of the optical combiner lens 500. Lens 504 may be made of the same materials as previously described for lens 108. In general, lens 504 is preferably made of a material that is transparent to at least wavelengths in the visible range.

Figure 8C:
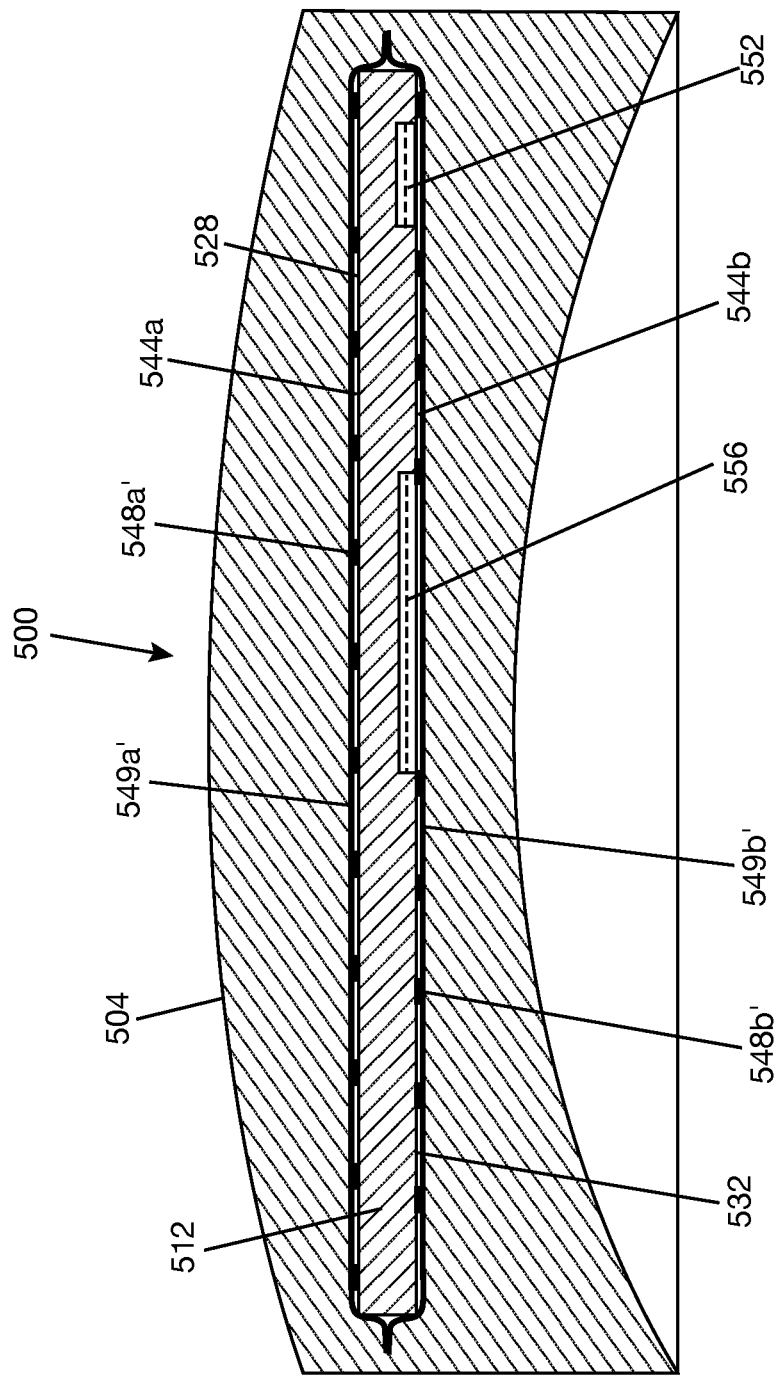
FIG. 8C is a cross-sectional view of a variant of the optical combiner lens of FIG. 8A showing protective layers with patterned surfaces to provide spacers between the lens and lightguide.

In another implementation, instead of providing spacers 548a, 548b on the lightguide surfaces that are separate from respective protective layers 549a, 549b, the protective layers may be patterned to provide the respective spacers. FIG. 8C shows an example where surfaces of protective layers 549a', 549b' in contact with lightguide surfaces 528, 532, respectively, are patterned to provide spacers 548a', 548b', respectively. Spacers 548a', 548b' will serve the same function as described above for spacers 548a, 548b, i.e., define medium gaps between the lightguide surfaces 518, 532 and lens 504. Protective layers 549a', 549b' can be made of a conformable or deformable material as previously described so as to conform to the shapes of lightguide surfaces 528, 532, respectively.

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. An optical combiner lens, comprising:
a lens having an outer lens surface and an inner lens surface;
a lightguide in a stack with the lens, the lightguide having a top lightguide surface and a bottom lightguide surface, the top lightguide surface in opposing relation to the inner lens surface with a gap defined between the top lightguide surface and the inner lens surface; and
a plurality of spacers, independent from the inner lens surface and lightguide, disposed in the gap to maintain the gap at a set height, wherein the plurality of spacers are distributed across the center of the top lightguide surface to maintain the gap at a set height.

2. The optical combiner lens of claim 1, wherein the set height of the gap is in a range from 2 microns to 100 microns.

3. The optical combiner lens of claim 1, wherein the spacers are microbeads.

4. The optical combiner lens of claim 1, wherein the spacers are micropillars.

5. The optical combiner lens of claim 1, wherein the spacers comprise silica.

6. The optical combiner lens of claim 1, wherein the spacers comprising a plastic material.

7. The optical combiner lens of claim 1, wherein the gap contains a medium in spaces between and around the spacers, the medium having a refractive index that is lower than a refractive index of the lightguide.

8. The optical combiner lens of claim 1, wherein a concentration of the spacers on the top lightguide surface is in a range from 1 to 100 spacers per mm2.

9. The optical combiner lens of claim 1, wherein the distribution of the spacers across the top lightguide surface is nonuniform.

10. The optical combiner lens of claim 9, wherein the lightguide has an input zone at which light enters the lightguide, an output zone from which light exits the lightguide, and a propagation zone between the input zone and the output zone that provides a propagation path for light from the input zone to the output zone;
wherein the top lightguide surface has a first area coinciding with at least one of the input zone, the output zone, and the propagation zone of the lightguide and a second area outside of the first area; and
wherein a concentration of the spacers on the first area is lower than a concentration of the spacers on the second area.

11. The optical combiner lens of claim 10, wherein the concentration of the spacers in the first area is zero.

12. The optical combiner lens of claim 1, further comprising an adhesive layer applied to at least one of the inner lens surface and the top lightguide surface, wherein at least some of the spacers contact the adhesive layer and are retained in place in the gap by the adhesive layer.

13. The optical combiner lens of claim 1, further comprising a deformable layer formed on the top lightguide surface, wherein at least some of the spacers are pressed into the deformable layer and retained in place in the gap by the deformable layer.

14. The optical combiner lens of claim 1, further comprising an output coupler positioned to couple light out of the lightguide and an input coupler positioned to couple light into the lightguide.

15. The optical combiner lens of claim 1, wherein the lens is a planoconvex lens or a meniscus lens, and wherein the lightguide is a planar lightguide.

16. The optical combiner lens of claim 1, further comprising a seal engaging the lens and the lightguide and circumscribing the gap, wherein the lightguide has a side edge extending from a perimeter of the top lightguide surface to a perimeter of the bottom lightguide surface, wherein at least a portion of the seal wraps around at least a portion of the side edge of the lightguide, and wherein the at least a portion of the seal comprises nanoparticles that absorb and/or scatter light.

17. The optical combiner lens of claim 1, further comprising a seal engaging the lens and the lightguide and circumscribing the gap, wherein the lightguide has a side edge extending from a perimeter of the top lightguide surface to a perimeter of the bottom lightguide surface, wherein at least a portion of the seal wraps around at least a portion of the side edge of the lightguide, and wherein the at least a portion of the side edge has an edge treatment selected from a shaped edge, a coated edge, a roughened edge, a polished edge, and an etched edge.

* * * * *